(12) United States Patent
Nakamura et al.

(10) Patent No.: US 8,479,991 B2
(45) Date of Patent: *Jul. 9, 2013

(54) ILLUMINATION SETTING SUPPORT APPARATUS OF OPTICAL INFORMATION READING APPARATUS

(71) Applicant: Keyence Corporation, Osaka (JP)

(72) Inventors: Shigeo Nakamura, Osaka (JP); Hajime Matsuda, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,627

(22) Filed: Nov. 26, 2012

(65) Prior Publication Data

US 2013/0082107 A1    Apr. 4, 2013

Related U.S. Application Data

(63) Continuation of application No. 13/205,764, filed on Aug. 9, 2011, now Pat. No. 8,342,404.

(30) Foreign Application Priority Data

Sep. 17, 2010    (JP) ................................. 2010-210249

(51) Int. Cl.
*G06K 7/10* (2006.01)

(52) U.S. Cl.
USPC . 235/455; 235/454; 235/462.06; 235/462.14; 235/462.42; 235/462.43; 235/462.44; 235/462.45; 235/473

(58) Field of Classification Search
USPC .......... 235/454, 455, 462.14, 462.44, 462.45, 235/472.01–472.03
See application file for complete search history.

(56) References Cited

U.S. PATENT DOCUMENTS

| | | | |
|---|---|---|---|
| 7,021,542 B2 | 4/2006 | Patel et al. | |
| 7,614,563 B1 | 11/2009 | Nunnink et al. | |
| 7,823,783 B2 | 11/2010 | Gerst et al. | |
| 7,874,487 B2 | 1/2011 | Nunnink et al. | |
| 2005/0023352 A1 | 2/2005 | Patel et al. | |
| 2005/0087601 A1* | 4/2005 | Gerst et al. | 235/455 |
| 2007/0090193 A1 | 4/2007 | Nunnink et al. | |
| 2012/0067957 A1 | 3/2012 | Nakamura et al. | |

FOREIGN PATENT DOCUMENTS

| | | |
|---|---|---|
| JP | 04-241476 | 8/1992 |
| JP | 2008-033465 | 2/2008 |
| JP | 2008-059194 | 3/2008 |
| JP | 2011-076517 | 4/2011 |
| JP | 2011-076519 | 4/2011 |

* cited by examiner

*Primary Examiner* — Tuyen K Vo

(74) *Attorney, Agent, or Firm* — Kilyk & Bowersox, P.L.L.C.

(57) ABSTRACT

There is provided an illumination setting support apparatus that enables a user to easily set an optimal lighting pattern while visually checking. A schematic diagram of the illumination unit is displayed in the setting screen, so that clicking on a desired area inside this schematic diagram allows the arbitrary area to be selected from eight areas in the circumferential row of the "outermost circumference" of the external illumination unit. Lighting pattern information is transmitted to a bar code reader and is transferred to the external illumination unit. Imaging is performed while executing illumination control in accordance with the lighting pattern to thereby immediately display a live image on a PC.

11 Claims, 26 Drawing Sheets

(INTERNAL ILLUMINATION: 5)

(LARGE-DIAMETER EXTERNAL ILLUMINATION: 4B)

(SMALL-DIAMETER EXTERNAL ILLUMINATION: 4A)

1

ILLUMINATION SETTING SUPPORT APPARATUS OF OPTICAL INFORMATION READING APPARATUS

CROSS-REFERENCE TO RELATED APPLICATIONS

The present application is a continuation of U.S. patent application Ser. No. 13/205,764, filed Aug. 9, 2011, and which claims foreign priority based on Japanese Patent Application No. 2010-210249, filed Sep. 17, 2010, the contents of which is incorporated herein by reference.

BACKGROUND OF THE INVENTION

1. Field of the Invention

The present invention relates to an illumination setting support apparatus of an optical information reading apparatus for reading optical information such as a bar code and a QR code.

2. Description of the Related Art

Now that traceability is widespread, an optical information reading apparatus is installed in a factory, a physical distribution complex and the like to decode optical information such as a bar code or an optical code given to a product or a commodity. This type of optical information reading apparatus is called a "bar code reader" or a "code reader".

The bar code reader irradiates the optical information with laser light, visible light, or infrared light to take in reflected light by an optical reading element (image pickup element). Analysis of information recorded in the optical information is performed from the picked-up image that has been taken in.

Japanese Unexamined Patent Publication No. 2008-33465 discloses a bar code reader. The bar code reader disclosed in Japanese Unexamined Patent Publication No. 2008-33465 includes a substantially rectangular parallelopiped outer case, and in this outer case, two LEDs for pointer, various types of substrates, a lens assembly, illumination LEDs are contained, so that imaging of optical information is executed while irradiating optical information with light of the illumination LEDs. If an amount of light of the illumination LEDs incorporated in the bar code reader is insufficient, an external illumination unit is additionally provided in the bar code reader and the illumination of the optical information is performed using the external illumination unit.

Japanese Unexamined Patent Publication No. H04-241476 discloses a ring-type external illumination unit, and partial illumination of lighting a part of a plurality of LEDs included in this ring-type external illumination unit. The use of such a technique of the partial illumination enables a variety of illumination.

Even if the illumination using the partial illumination is desired, in the case where the external illumination unit to be used only has the ability of ON/OFF, the partial lighting using the external illumination unit is impossible. Moreover, even if the external illumination unit has the ability of the partial lighting, an optimal lighting pattern cannot be set if the ability, i.e., what lighting patterns of the partial illumination the external illumination unit can perform, is not known.

Moreover, the recent bar code reader generally has an illumination unit incorporated therein, and when the external illumination unit is used in combination with the internal illumination of the bar code reader, work for setting an optimal lighting pattern becomes complicated, because there exist a number of possible lighting patterns.

SUMMARY OF THE INVENTION

An object of the present invention is to provide an illumination setting support apparatus that supports setting of illumination of an optical information reading apparatus.

Another object of the present invention is to provide an illumination setting support apparatus that enables a user to intuitively set a lighting pattern.

Still another object of the present invention is to provide an illumination setting support apparatus that enables the user to easily set the optimal lighting pattern while visually checking.

According to the present invention, the above technical objects are achieved by providing an illumination setting support apparatus that supports setting of illumination of an optical information reading apparatus that reads optical information while illuminating the optical information given to a work with a surface light source, the illumination setting support apparatus including:

an illumination model recognizing device that recognizes a model of an external illumination unit connected to the optical information reading apparatus;

a schematic diagram display device that displays a diagram schematically expressing all areas resulting from dividing, into a plurality of areas, the surface light source of the external illumination unit whose model is recognized;

an area selecting device that enables a user to select at least one of the areas from the schematic diagram displayed by the schematic display device;

a lighting pattern transmitting device that transmits a lighting pattern defining the selected area to the optical information reading apparatus, when the area is selected by the area selecting device; and a picked-up image display device that acquires an image that the optical information reading apparatus picks up while controlling lighting of the external illumination unit in accordance with the lighting pattern, and displays the picked-up image.

That is, in the illumination setting support apparatus of the present invention, first, the model of the external illumination unit connected to the optical information reading apparatus is recognized to know the ability of the external illumination unit, and the plurality of areas settable when the external illumination unit performs the partial illumination are displayed. When the user selects the area that the user wants to light, the picked-up image based on this lighting pattern is displayed in real time. The picked-up image may be a live image, or may be a static image. If the picked-up image is the live image, the user can check how the light is thrown while moving a test piece in a visual field range of the optical information reading apparatus.

This allows the user to set the optimal lighting pattern while recognizing change in how the illumination is applied in real time by trying the various selections of the areas. Other objects, and operation and effects of the present invention will be clear from detailed description of embodiments below.

DETAILED DESCRIPTION OF THE PREFERRED EMBODIMENT

Embodiment

Hereinafter, a preferred embodiment of the present invention will be described based on the accompanying drawings.

Figure 1:
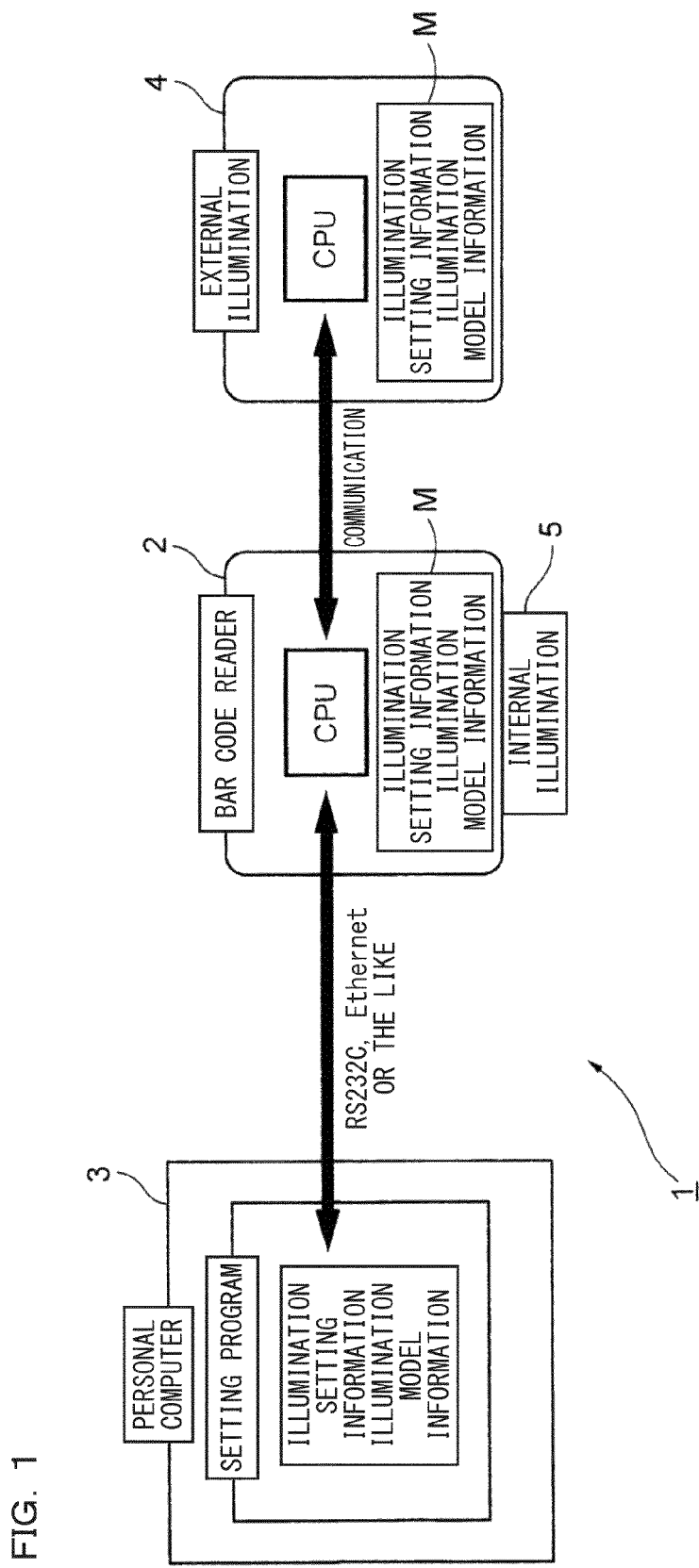
FIG. 1 is an overall configuration diagram of a bar code reader system.

Bar Code Reader System (FIG. 1):

FIG. 1 is a diagram for describing an outline of a bar code reader system. Referring to FIG. 1, a bar code reader system 1 has a bar code reader 2, which is a two-dimensional information reading apparatus, and a personal computer 3 connected to the bar code reader 2 as needed, and makes various settings using the personal computer 3 while checking, on the personal computer 3, an image picked up by the bar code reader 2. In the bar code reader system 1, a ring-type external illumination unit 4 is further connected to the bar code reader 2 as needed to illuminate a work together with an internal illumination unit 5 of the bar code reader 2, or only by the external illumination unit 4 with operation of the internal illumination unit 5 stopped.

The ring-type external illumination unit 4 is a dedicated member for the bar code reader system 1. It is preferable to prepare a plurality of different types of external illumination units 4. Obviously, an illumination unit other than the dedicated member can be incorporated as the external illumination unit 4.

The bar code reader system 1 is installed in a conveyance path of products or goods in a factory where the products or goods on which optical information or an optical code such as barcode or QR code is printed or inscribed are manufactured, so that information recorded in the optical information printed on the products or goods is read by the bar code reader 2, and this information is transferred to the personal computer 3 to analyze the information. An "optical information reading apparatus" is generally called a "bar code reader" or a "code reader", and herein, an industry term, the "bar code reader" is used.

Figure 18:
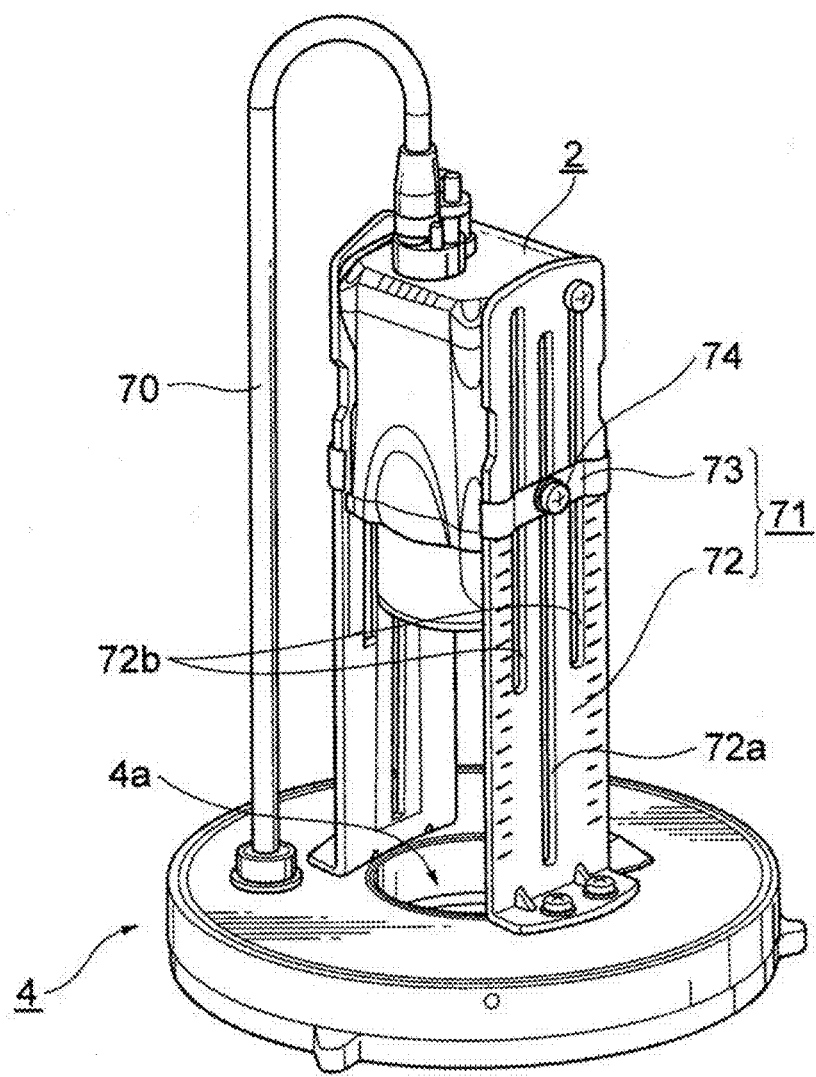
FIG. 18 is a view showing a state where an external illumination unit is attached to the bar code reader.

In an example shown in the figure, as disclosed in FIG. 1, a setting program is installed on the personal computer 3, by which using the personal computer 3, various settings of the bar code reader system 1 are made. Obviously, the bar code reader 2 may be provided, for example, with a display device with a touch panel to enable setting work of the bar code reader 2, the internal illumination unit 5 (FIG. 3), and/or the external illumination unit 4 (FIGS. 18 and 19), using this display device.

Figure 2:
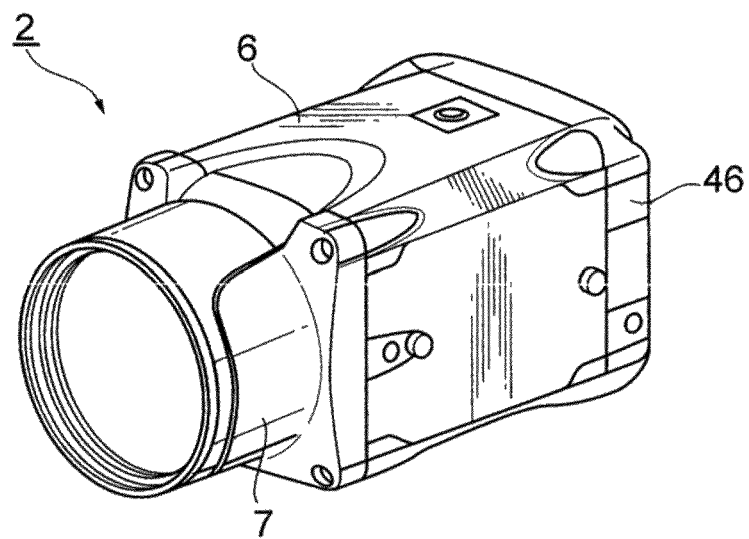
FIG. 2 is a perspective view of a bar code reader, which is an optical information reading apparatus.

Bar Code Reader 2 (FIGS. 2 to 17):

FIG. 2 is a perspective view showing an appearance of the bar code reader 2. The bar code reader 2 has a main case 6 having a polygonal cross-sectional shape, and a cylindrical front case 7 fixed to a front end of the main case 6, and the foregoing internal illumination unit 5 is incorporated in the cylindrical front case 7. The main case 6 preferably has a substantially square cross-sectional shape, as seen from FIG. 2 and the like.

Figure 3:
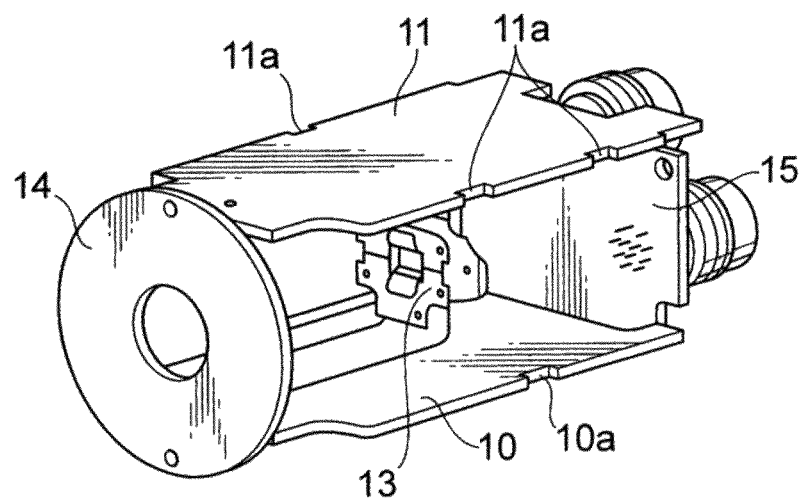
FIG. 3 is a view when arrangement of various types of substrates arranged inside the bar code reader is seen from an obliquely front side.
Figure 4:
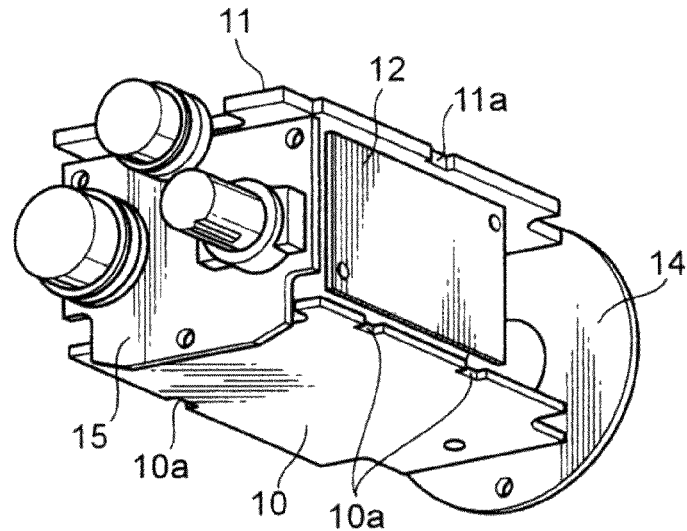
FIG. 4 is a view related to FIG. 3, wherein the arrangement of the various types of substrates arranged inside the bar code reader is seen from an obliquely rear side.
Figure 5:
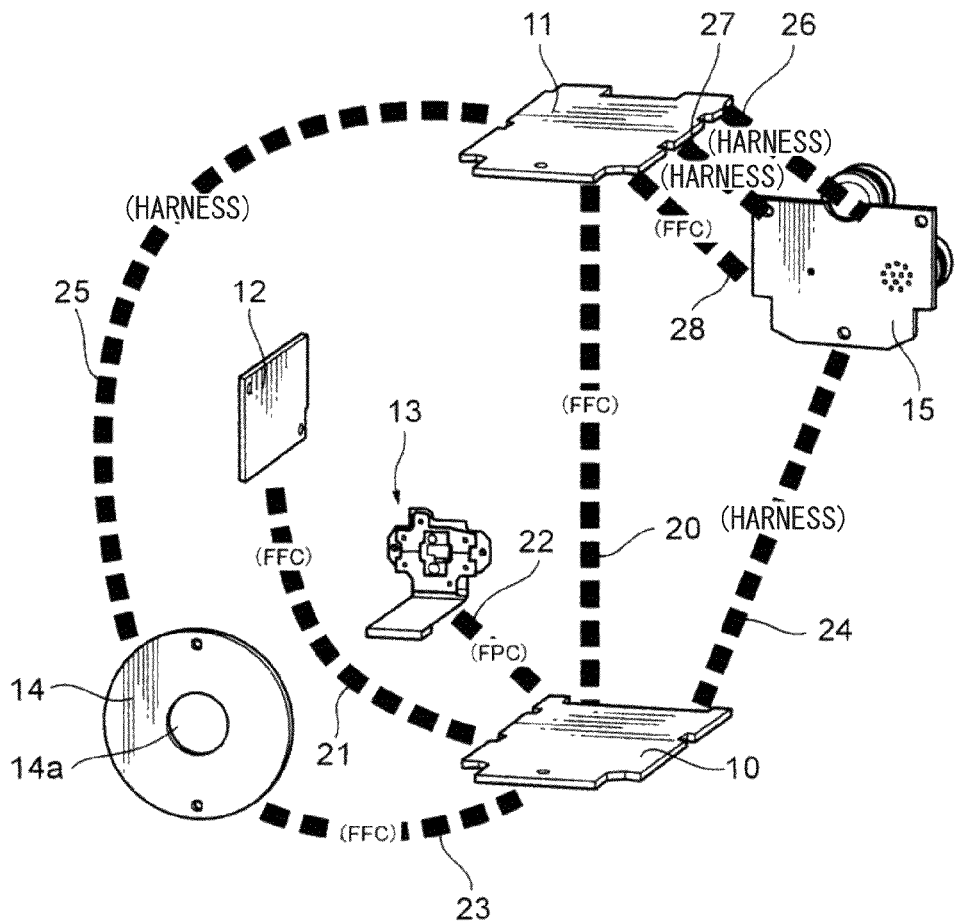
FIG. 5 is a view for describing connection wiring relationships of the various types of substrates incorporated in the bar code reader.

A plurality of substrates independent from one another are incorporated in the bar code reader 2. Referring to FIGS. 3 to 5, the plurality of substrates included in the bar code reader 2 are as follows.

(1) Main Substrate 10:

In a main substrate 10, a CPU and a memory M are mounted to transfer an image to the memory M and process the image in a DSP (Digital Signal Processor). The bar code reader 2 including the internal illumination unit 5 is controlled by the CPU of the main substrate 10, and communication with the external illumination unit 4 is executed.

(2) Power Supply Substrate 11:

A power supply of the bar code reader 2 is generated. An insulated input and output circuit is installed.

(3) Sub Substrate 12:

A large-capacity memory is mounted and an acquired image and various settings are stored in this large-capacity memory. On this substrate, elements that cannot be mounted on the main substrate 10 with a limited size and shape are mounted.

(4) CMOS Substrate 13 (Light-Receiving Substrate):

A CMOS image sensor (optical reading element) is installed, so that the image is acquired and transferred to the main substrate 10. LEDs 40 for pointer (FIG. 10) are mounted.

(5) LED Substrate 14:

An LED substrate 14 is a disc-like substrate with a circular opening 14a making up the internal illumination unit 5. A plurality of illumination LEDs 80 are installed on the LED substrate 14 (FIG. 22 described later), so that lighting control of the illumination LEDs 80 is executed. The plurality of illumination LEDs 80 are arrayed on a plurality of concentric circles with different diameters centering on an optical axis of a later-described lens assembly 36 of the bar code reader 2. The plurality of illumination LEDs 80 installed in the internal illumination unit 5 (in the LED substrate 14) are subjected to the light control by being divided into areas as will be described later. In the LED substrate 14, constant current circuits that supply a constant current to the plurality of illumination LEDs belonging to the respective areas are provided.

(6) Connector Substrate 15:

A connector substrate 15 is a substrate making up an interface of input and output with respect to an external power supply, an IO, an RS232C, Ethernet (registered trademark), and the external illumination unit 4. Power is supplied to the external illumination unit 4 from the power supply substrate 11.

Referring to FIGS. 3 and 4, the main substrate 10 and the power supply substrate 11 are arranged in opposition to each other, and in a region sandwiched by respective side edges of the main substrate 10 and the power supply substrate 11, the sub substrate 12 is provided orthogonally to the main substrate 10 and the power supply substrate 11. An arrangement position of the sub substrate 12 and the main substrate 10 may be exchanged. The main substrate 10, the power supply substrate 11, and the sub substrate 12 are disposed adjacent to three side surfaces of four side surfaces of the main case 6 having a rectangular cross section in the bar code reader 2, and along the respective three side surfaces. The CMOS substrate 13 is located in a space surrounded by the main substrate 10, the power supply substrate 11 and the sub substrate 12, and the CMOS substrate 13 is disposed on one vertical surface orthogonal to the respective substrates 10 to 12. The LED substrate 14 and the connector substrate 15 are positioned parallel to the CMOS substrate 13 so as to be opposed to each other with the CMOS substrate 13 interposed therebetween.

FIG. 5 is a view for describing connection relationships of the substrates 10 to 15. The main substrate 10 is connected to the power supply substrate 11 through a first FFC 20 (Flexible Flat Cable) and to the sub substrate 12 through a second FFC 21, to the CMOS substrate 13 through an FPC (Flexible Printed Circuit) 22, to the LED substrate 14 of the internal illumination unit 5 through a third FFC 23, and to the connector substrate 15 through a first harness 24. The power supply substrate 11 is also connected to the LED substrate 14 of the internal illumination unit 5 through a second harness 25, so that the power supply to cause the illumination LEDs installed in the LED substrate 14 to emit light is supplied from the power supply substrate 11 to the LED substrate 14. The power supply substrate 11 and the connector substrate 15 are connected through two harnesses 26, 27 and an FFC 28.

Referring again to FIG. 5, it should be noted that the main substrate 10 and the power supply substrate 11 have substantially the same size and shape. In other words, the main substrate 10 is designed to have substantially the same size and shape as the power supply substrate 11, and electronic components that cannot be mounted on the main substrate 10 because of these limitations are mounted on the sub substrate 12.

Figure 6:
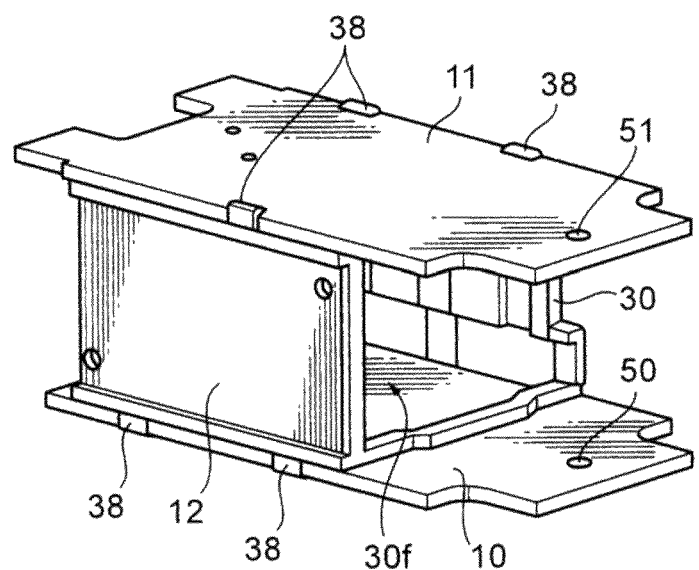
FIG. 6 is a view for describing arrangement of a chassis incorporated in the bar code reader, and a main substrate, a power supply substrate, and a sub substrate assembled to the chassis.
Figure 7:
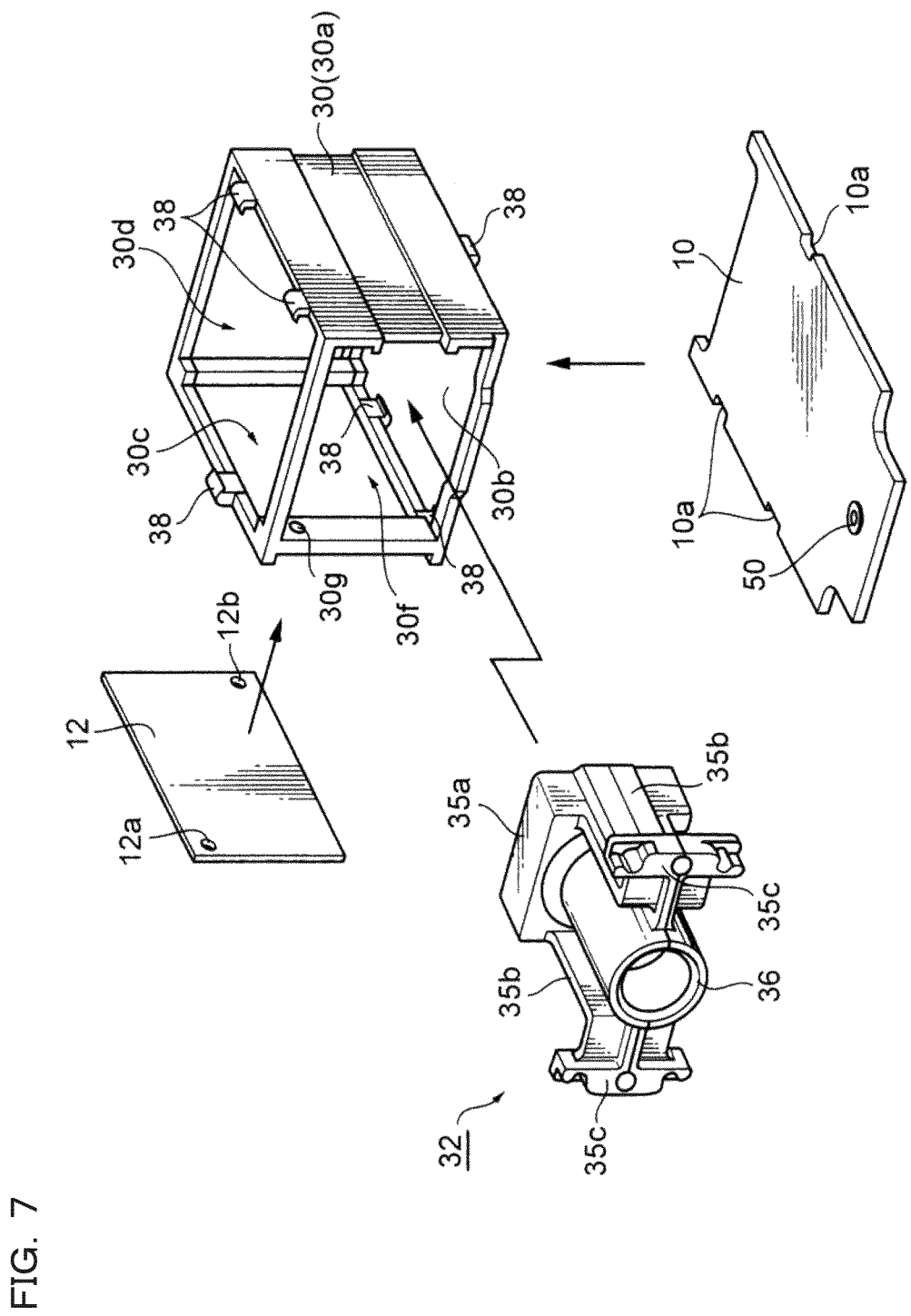
FIG. 7 is a view for describing various elements assembled to the chassis.

Referring to FIGS. 6 and 7, the main substrate 10, the power supply substrate 11, the sub substrate 12, and the CMOS substrate 13 are assembled to a chassis 30, which is a resin molded article. As best seen in FIG. 7, the chassis 30 has a box shape having a substantially square cross-sectional shape, which is an almost similar shape to the cross-sectional shape of the main case 6, and has a form in which one side surface 30a of this box shape is closed and the other five surfaces are open. The main substrate 10, the power supply substrate 11, and the sub substrate 12 are disposed on three open side surfaces 10b to 10d, respectively. The chassis 30 of the resin molded article is open at the front and rear thereof, and a camera module 32 is inserted from a one-end opening 30f (FIG. 7). The main substrate 10, the power supply substrate 11, and the sub substrate 12 are located around the camera module 32 inserted into the chassis 30, which brings a state where the camera module 32 is encompassed by the main substrate 10, the power supply substrate 11, and the sub substrate 12.

Figure 8:
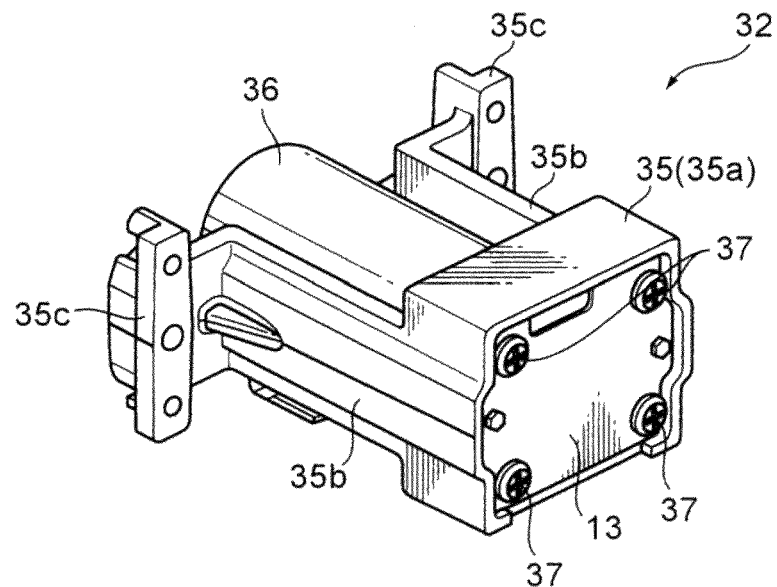
FIG. 8 is a view when a camera module is seen from an obliquely rear side.
Figure 9:
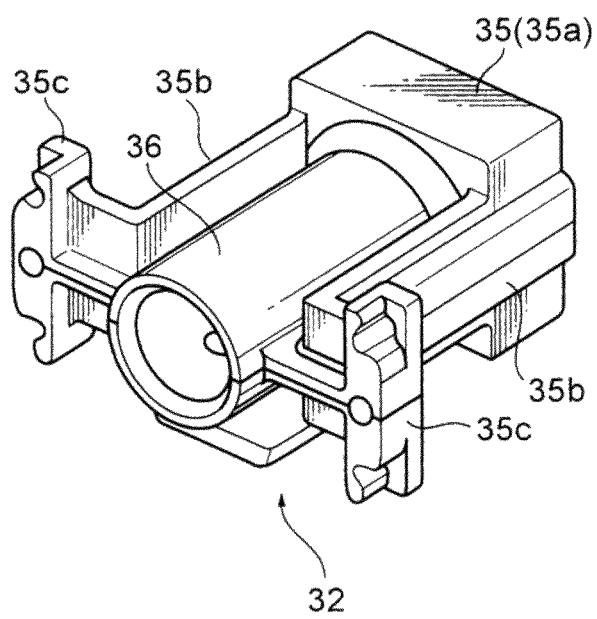
FIG. 9 is a view when the camera module is seen from an obliquely front side.

Referring to FIGS. 8 and 9, the camera module 32 has a camera holder 35 made of a die casting material such as aluminum, and the camera holder 35 has a holder body 35a having a rectangular cross section, a pair of arms 35b extending forward and parallel to each other from side surfaces of the holder body 35a opposed to each other, and a pair of attachment portions 35c extending from front ends of the pair of arms 35b in directions away from each other. The CMOS substrate 13 is fixed to a rear end surface opening rearward of the holder body 35a by a plurality of screws 37 (FIG. 8).

For positioning of the main substrate 10 and the power supply substrate 11, six claws 38 are integrally formed in the chassis 30 (FIG. 7), and using these six claws 38, the main substrate 10 and the power supply substrate 11 opposed to the same are positioned on two open side surfaces 30b, 30d of the chassis 30 opposed to each other, respectively. Cut-outs 10a to receive the claws 38 are formed in the main substrate 10 (FIG. 7). Cut-outs 11a are similarly formed in the power supply substrate 11 (FIG. 3). Referring to FIG. 7, the rectangular sub substrate 12 has a pair of through-holes 12a, 12b at diagonally opposite corner portions, and a pair of through-holes 30g (one of the through-hole does not appear in the drawing for a drawing reason) is formed in the chassis 30 corresponding to the pair of through-holes 12a, 12b. These through-holes 12a, 12b, and 30g are matched, which allows the sub substrate 12 to be mounted on the chassis 30 by the screws.

Figure 10:
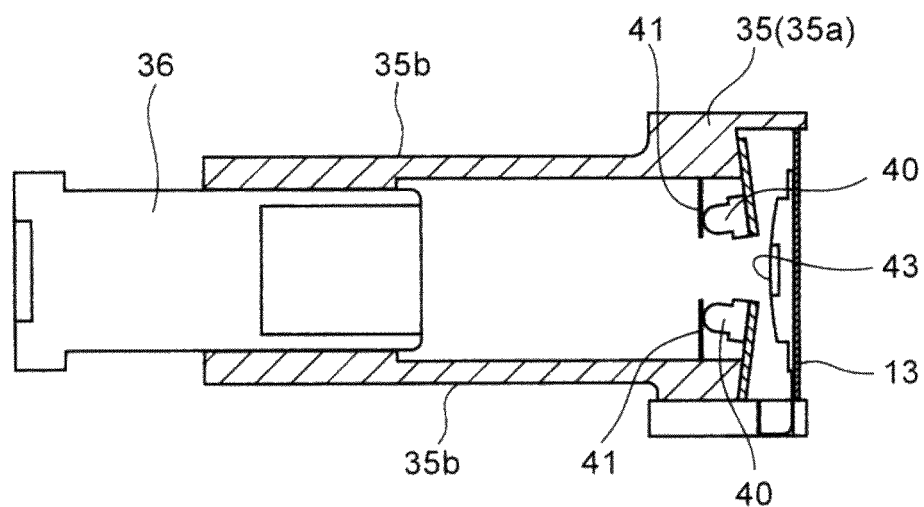
FIG. 10 is a conceptual view for describing an internal structure of the camera module.

Arrangement of LEDs for Pointer (FIG. 10):

The camera module 32 has the cylindrical lens assembly 36, and the lens assembly 36 is disposed between the pair of arms 35b, 35b of the camera holder 35. Referring to FIG. 10, the CMOS substrate 13 is fixed to a rear-end opening of the holder body 35a, using the screws 37 (FIG. 8). A pair of LEDs 40, 40 for pointer is mounted on the CMOS substrate 13. In connection with the LEDs 40 for pointer, diffusion sheets 41 are disposed immediately in front of the respective LEDs 40 for pointer in the holder body 35a. Light of the two LEDs 40 for pointer is radiated forward through the diffusion sheets 41 and the lens assembly 36, and points to two points at a distance from each other within a visual field range of the bar code reader 2. Reference numeral 43 in FIG. 10 denotes a CMOS image sensor which is an optical reading element, and the optical reading element 43 is installed in the CMOS substrate 13.

The LEDs 40 for pointer are incorporated in the camera module 32, which makes it easy to keep a relational position between the optical reading element 43 and the LEDs 40 for pointer constant, and to downsize the bar code reader 2. Particularly, the LEDs 40 for pointer share the lens assembly body 36 of the bar code reader 2 with the optical reading element 43, which makes it easy to downsize the bar code reader 2 because dedicated lenses for the LEDs 40 for pointer become unnecessary.

The camera module 32 is characterized in that a distance between the optical reading element (image pickup element) 43 and the lens assembly 36 is very large as compared with a case in the related art, and that in the optical information such as the bar code and the QR code, even an ultramicro region thereof can be read with a high resolution. When the camera module 32 larger in length dimension as compared with the related art is contained in the bar code reader 2, the above-described substrate arrangement should be noted. That is, introducing the technical idea of surrounding the camera module 32 by the main substrate 10, the power supply substrate 11 and the sub substrate 12 enables the long camera module 32 to be contained in the outer case while downsizing the bar code reader 2.

Specifications of the camera module 32 are as follows.
(1) Optical magnification: 0.6 to 1.0 fold (in the embodiment, 0.823 fold)
(2) Visual field range: 7.5 mm×4.8 mm to 4.5 mm×2.9 mm (in the embodiment, 5.5 mm×3.5 mm)
(3) Distance from the optical reading element to the lens at a fore-end: 35 mm or more (in the embodiment, 40 mm)

Figure 11:
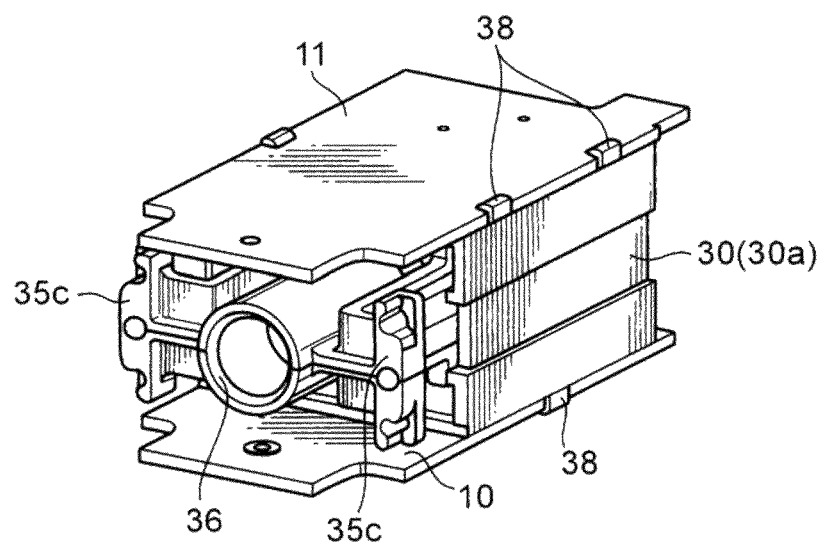
FIG. 11 is a view showing relationships between the camera module and the various types of substrates, wherein the bar code reader is contained in a main case of the bar code reader in this state.
Figure 12:
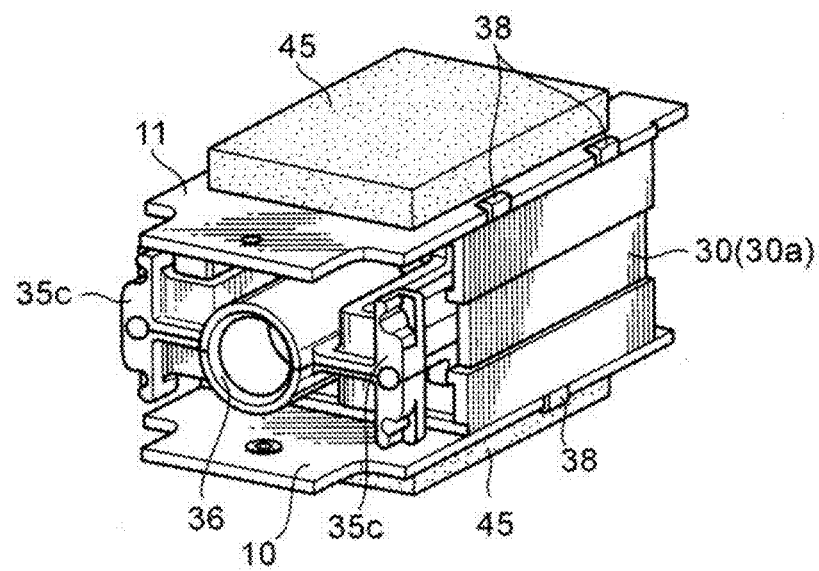
FIG. 12 is a view showing the relationships between the camera module and the various types of substrates as in FIG. 11, wherein as a preferable example, thermally conductive rubbers as heat releasing members are placed on the power supply substrate and the main substrate.

FIG. 11 is a perspective view of an assembly in which the substrates 10, 11, 12 and the camera module 32 are assembled to the chassis 30. FIG. 12 shows a state where thermally conductive rubbers 45 are respectively placed on the main substrate 10 and the power supply substrate 11 as heat releasing members having cushion properties and excellent thermal conductivity. If the heat release properties of the bar code reader 2 are required, the assembly is contained in the main case 6 (FIG. 2) having the rectangular cross section with the thermally conductive rubbers 45 attached in the aspect illustrated in FIG. 12 (FIG. 13).

The main substrate 10 and the power supply substrate 11 are arranged adjacent to, and along the different side surfaces of the main case 6 having the polygonal cross section and made of a metal material excellent in thermal conductivity, which makes it easy to release heat of the main substrate 10 and the power supply substrate 11 outside, and enables the camera modules 32 to be contained in the space surrounded by the main substrate 10 and the power source substrate 11, thereby enabling the further downsizing of the bar code reader 2. Particularly, interposing the heat releasing members such as the thermally conductive rubbers 45 between the main substrate 10 and the main case 6, and between the power substrate 11 and the main case 6, can increase heat release efficiency, and can further downsize the bar code reader 2 from this view point.

Figure 13:
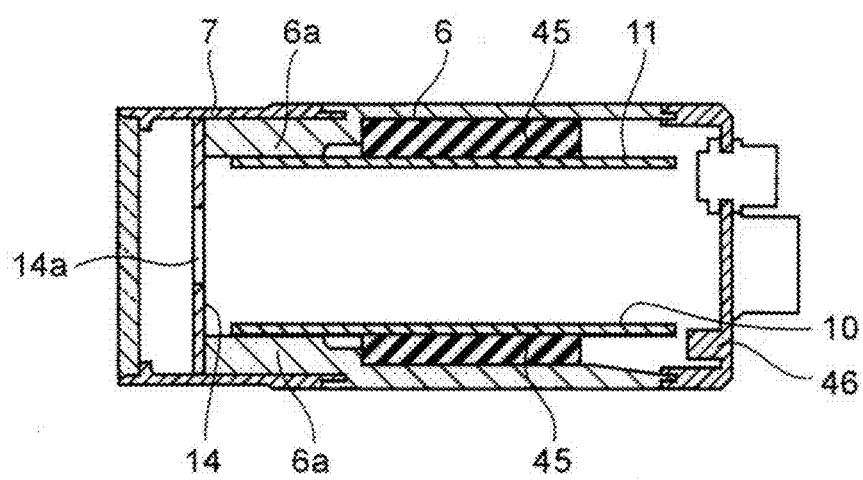
FIG. 13 is a view for describing a state where the thermally conductive rubbers abut on the power supply substrate, the main substrate, and the main case in connection with FIG. 12.
Figure 15:
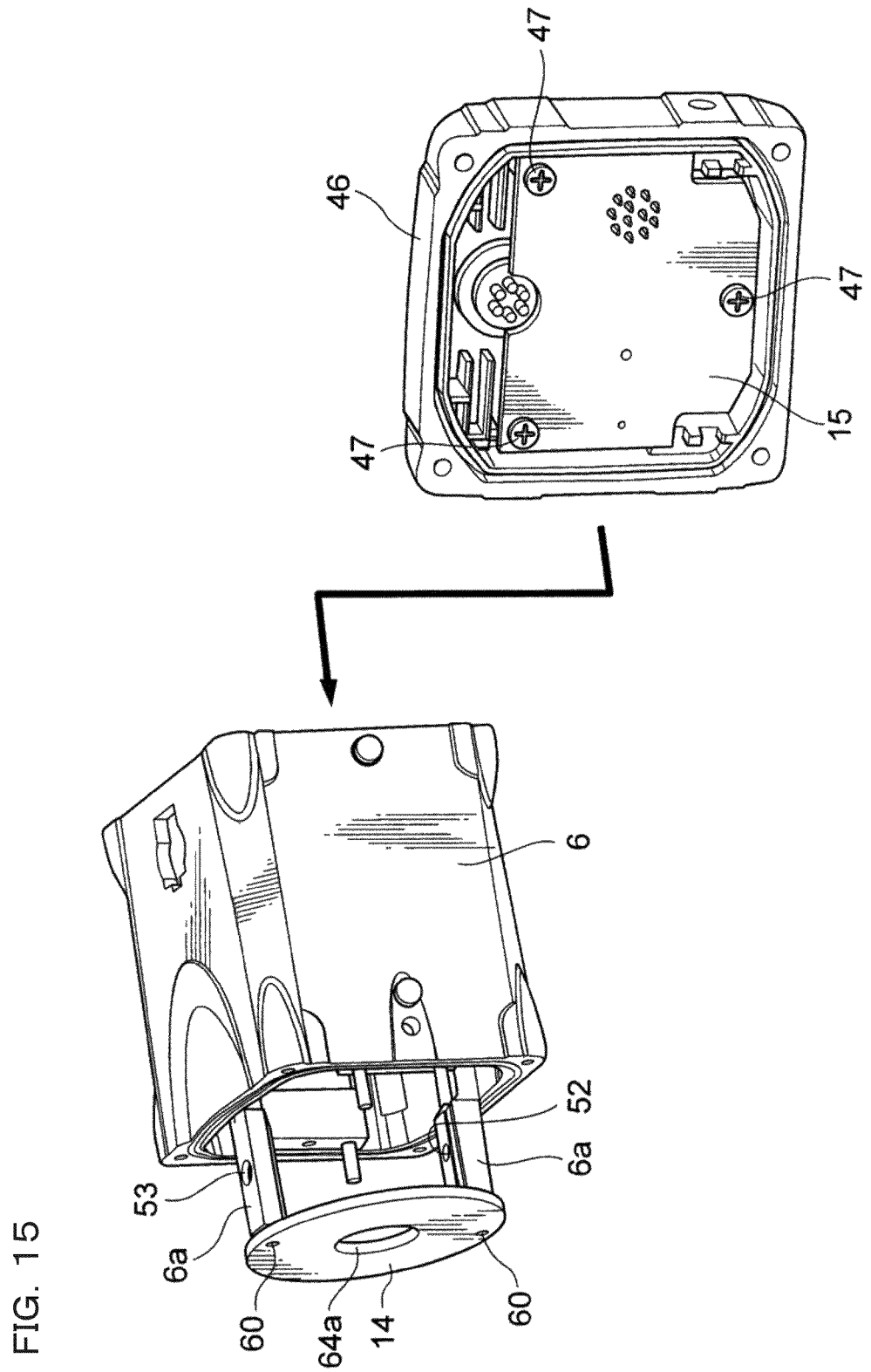
FIG. 15 is an exploded perspective view for describing the main case of the bar code reader, and how an open rear end of the main case is closed by a rear case, wherein a connector substrate is fixed to the rear case.

Reference numeral 46 in FIGS. 13 and 15 denotes a rear case, which is detachably attached to a rear-end opening of the main case 6 to close the main case 6. The connector substrate 15 is attached to the rear case 46 and the connector substrate 15 is fixed to the rear case 46 using screws 47 (FIG. 15). For example, the main case 6, the front case 7, and the rear case 46 making up the outer case of the bar code reader 2 is preferably made of a metal material excellent in thermal conductivity, for example, a thermally conductive material such as aluminum.

Referring to FIG. 6, the main substrate 10 and the power source substrate 11 have through-holes 50, 51 in front-end narrow-width portions, respectively. The main case 6 of the bar code reader 2 has a pair of rod-like extended portions 6a, which extend parallel to each other and forward to an inside of the cylindrical front case 7 (FIG. 15).

Figure 14:
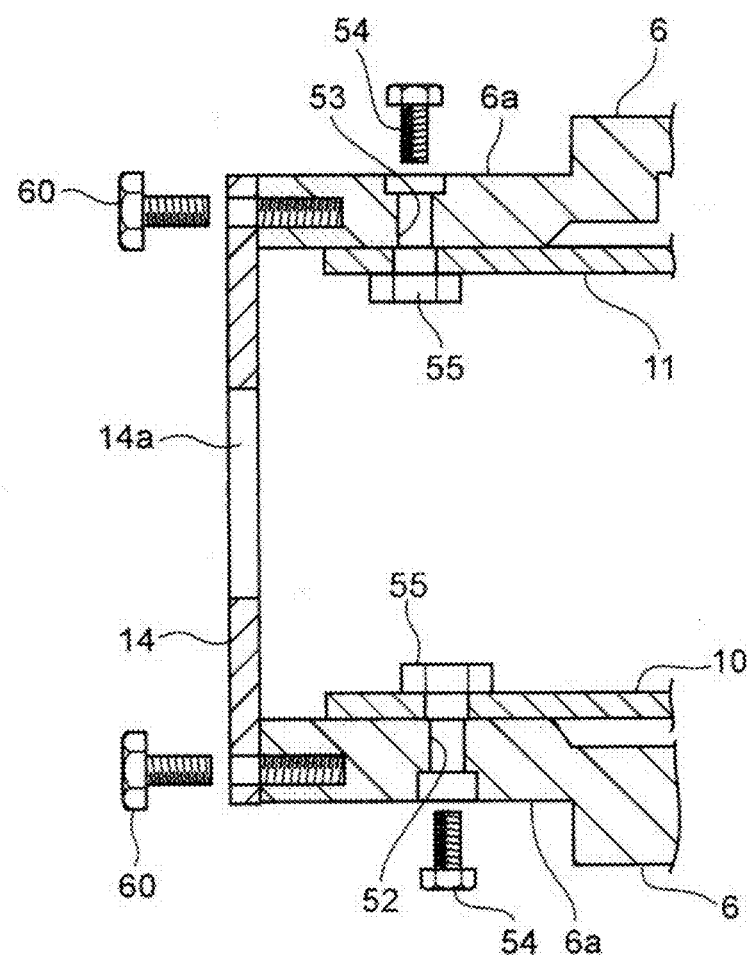
FIG. 14 is a view for describing that an LED substrate (internal illumination substrate) is attached to front end surfaces of a pair of rod-like extended portions extending forward from the main case, and front ends of the power supply substrate and the main substrate are fixed to the extended portions.

Referring to FIG. 14 in which a front end portion of the main case 6 is extracted, through-holes 52, 53 related to the through-holes 50, 51 of the front-end narrow-width portions of the main substrate 10 and the power supply substrate 11 are formed in the pair of extended portions 6a of the main case 6, and using screws 54 inserted into these through-holes 52, 53, the main substrate 10 and the power supply substrate 11 are fixed to the main case 6 (the extended portions 6a). This allows each of the main substrate 10 and the power supply substrate 11 positioned by the three claws 38 of the chassis 30 to be fixed to each of the extended portions 6a extending forward of the main case 6 by one of the screws 54. In other words, the chassis 30 is fixed to the main case 6 by the total of two screws 54. In order to facilitate work of tightening the screws 54 and work of removing the screws 54, nuts 55 into which the screws 54 are screwed are preferably installed at the through-hole 50 of the main substrate 10 and the through-hole 51 of the power supply substrate 11. To the pair of rod-like extended portions 6a of the main case 6 is fixed the ring-shaped LED substrate 14 at a front-end surface thereof by screws 60. The ring-shaped LED substrate 14 is arranged around the lens assembly 36, and the plurality of illumination LEDs 80 mounted on the LED substrate 14 form a ring-shaped surface light source located on the outer circumferential side of the lens assembly 36.

Figure 16:
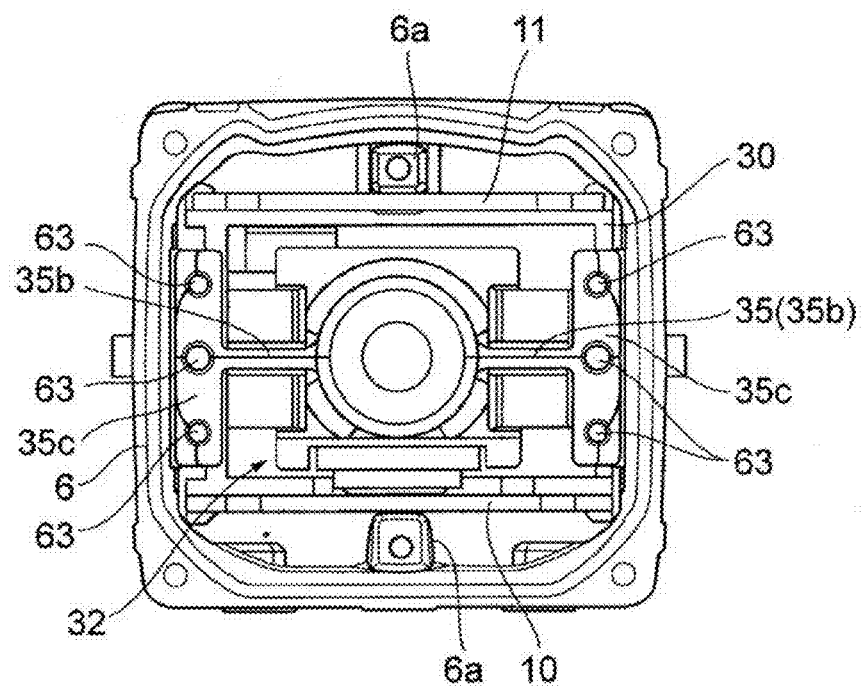
FIG. 16 is a front view of the main case containing incorporated members illustrated in FIG. 15.
Figure 17:
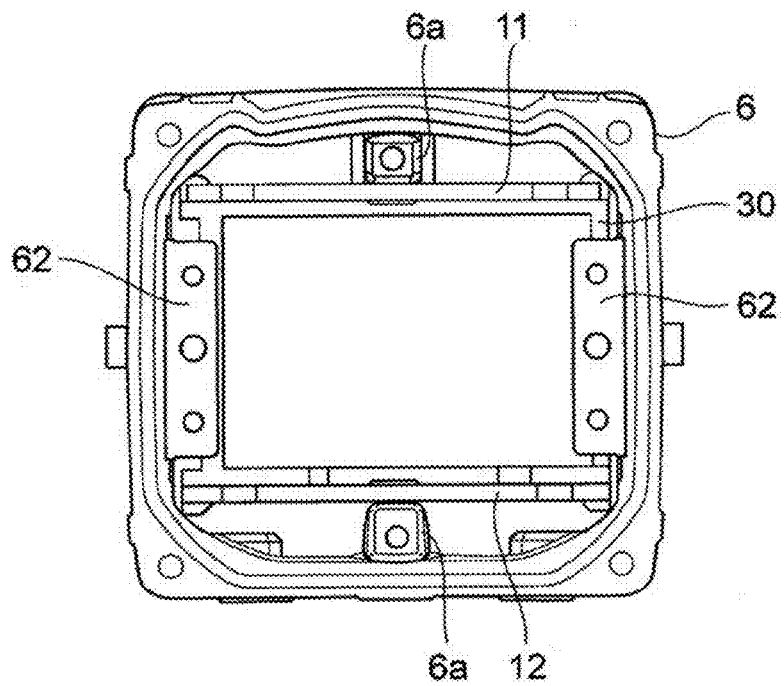
FIG. 17 is a front view of the main case in a state where the camera module is removed from FIG. 16.

FIG. 17 is a view when the main case 6 is seen from the front side. The main case 6 has a pair of right and left attachment seats 62 in the front-end surface thereof, and the camera module 32 is fixed to the main case 6, using this pair of attachment seats 62. FIG. 16 is a front view of the main case 6 with the camera module 32 incorporated therein. FIG. 17 is a front view of the main case 6 illustrated in a state where the camera module 32 is removed.

Fixing the camera module 32 to the main case 6, which is a metal molded article, can increase positioning accuracy of the camera module 32, thereby increasing positioning accuracy of the visual field range, as compared with a case where the camera module 32 is fixed to the chassis 30.

Since there is employed a configuration in which the assembly in which the major substrates incorporated in the bar code reader 2, that is, the power supply substrate 11, the main substrate 10, and the like, and the camera module 32 including the lens assembly 36 are assembled to the chassis is incorporated in the outer case (main case 6), preparing a plurality of types of camera modules 32 enables a plurality of types of bar code readers 2 to be provided to a user, using the same outer case. For the different types of camera modules 32, the same power supply substrate 11, the main substrate 10, and the like are employed, and the same outer case is used to manufacture the bar code reader 2.

The pair of right and left attachment portions 35c of the camera module 32 are seated on the pair of right and left attachment seats 62 of the main case 6, and the respective attachment portions 35c are fixed to the corresponding attachment seats 62, using four screws 63 (FIG. 16).

Figure 20:
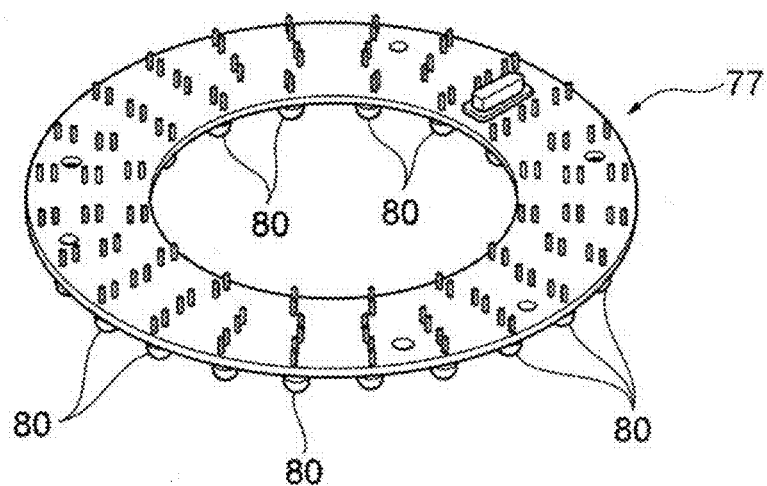
FIG. 20 is a perspective view of the LED substrate with LEDs to be incorporated in the external illumination unit.

Dedicated External Illumination Unit 4 (FIGS. 18 to 21):

FIG. 20 shows a state where the dedicated external illumination unit 4 is attached to the bar code reader 2, and reference numeral 70 denotes a cable connecting the bar code reader 2 and the external illumination unit 4. The power of the external illumination unit 4 is supplied from the bar code reader 2.

The external illumination unit 4 in a ring outer shape has a circular outline, and has a circular opening 4a in its center. The bar code reader 2 is positioned so that the center of the circular opening 4a matches the optical axis of the lens assembly 36 of the bar code reader 2. A stand 71 is prepared to position the bar code reader 2. As will be described in detail later, the stand 71 is made up of a pair of plate members 72 fixed to a back surface of the external illumination unit 4 by bolts, and attachment fittings 73 to fixedly set the bar code reader 2 at an arbitrary height position of the plate members 72.

Figure 19:
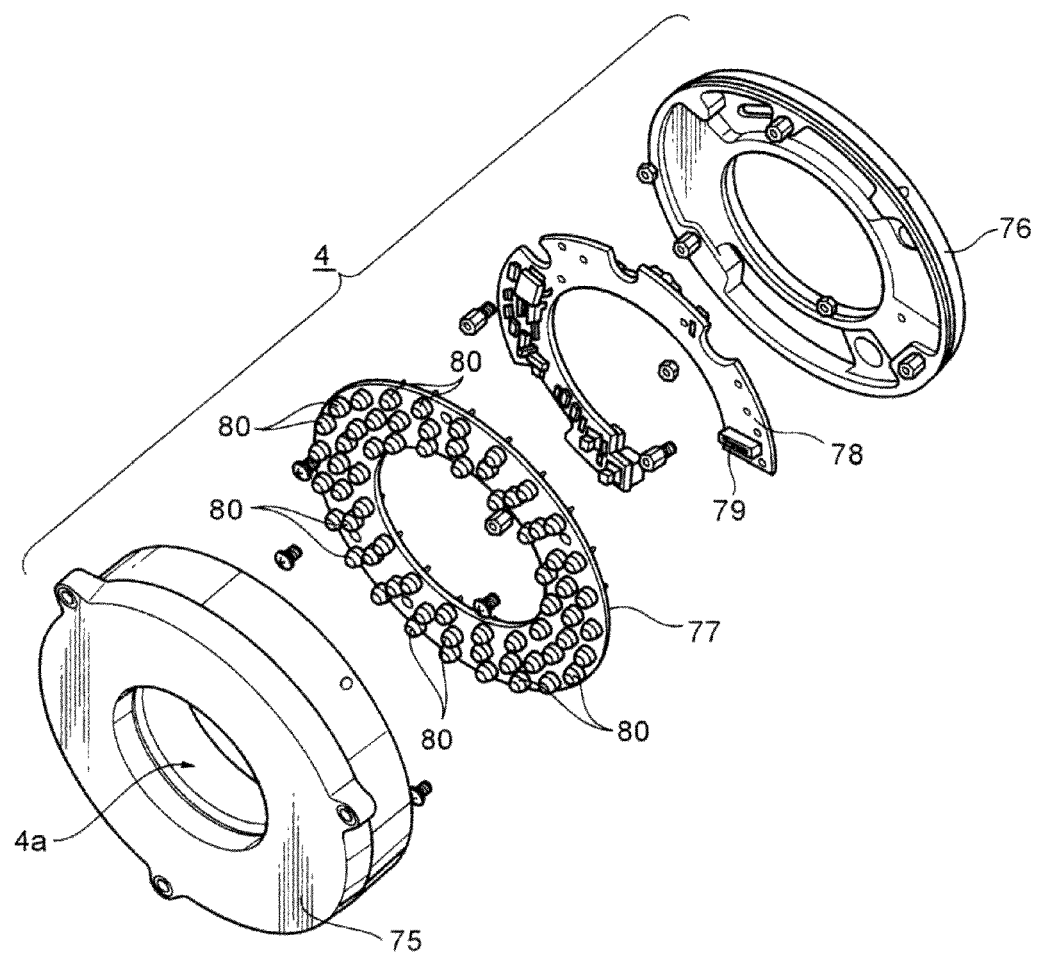
FIG. 19 is an exploded perspective view of the external illumination unit.

First, a structure of the external illumination unit 4 will be described with reference to FIG. 19. FIG. 19 is an exploded perspective view of the external illumination unit 4. In the external illumination unit 4, an LED substrate 77 and a circuit substrate 78 are contained in an outer case made up of ring-shaped, cylindrical front case 75 and rear case 76 in a layered state with a stack connector 79 (FIG. 19) and first spacers 82 (FIG. 21) interposed therebetween.

Figure 21:
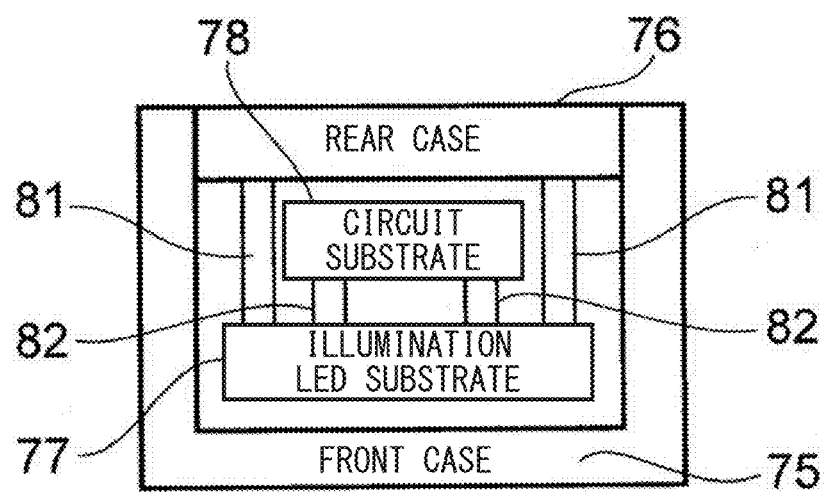
FIG. 21 is a diagram for describing attachment relationships of two substrates assembled to the external illumination unit.

The plurality of illumination LEDs 80 are installed in the ring-shaped LED substrate 77 having almost the same size as that of a ring cross-sectional shape of the ring-shaped, cylindrical front case 75. In the ring-shaped circuit substrate 78 preferably having almost the same size as the ring-shaped LED substrate 77, a CPU that controls the lighting of the plurality of LEDs 80 mounted on the external illumination unit 4, and controls communication with the bar code reader 2, and a memory M (FIG. 1) is installed in addition to an LED drive circuit. Referring to FIG. 21, obviously, the LED substrate 77 and the circuit substrate 78 are electrically connected, and the LED substrate 77 and circuit substrate 78 are fixed to each other by the first spacers 82, and the LED substrate 77 is fixed to the rear case 76 by second spacers 81. In other words, the circuit substrate 78 is fixed to the rear case 76 via the LED substrate 77.

For example, when a Fresnel lens (not shown) is employed in the front case 75, relative positioning between the illumination LEDs 80 of the LED substrate 77 and the front case 75 is important. In the example of FIG. 21, since the LED substrate 77 is positioned with respect to the front case 75 via the rear case 76, this not only allows the front case 75 and the LED substrate 77 to be relatively positioned, but also facilitates assembling work of the LED substrate 77 and the circuit substrate 78.

As a first modification, regarding a setting structure of the LED substrate 77 and the circuit substrate 78, instead of interposing the LED substrate 77, the circuit substrate 78 may be directly fixed to the rear case 76 via spacers. As a second modification, the circuit substrate 78 may be fixed to the rear case 76 via spacers, and the LED substrate 77 may be fixed to the circuit substrate 78 via other spacers.

Figure 23:
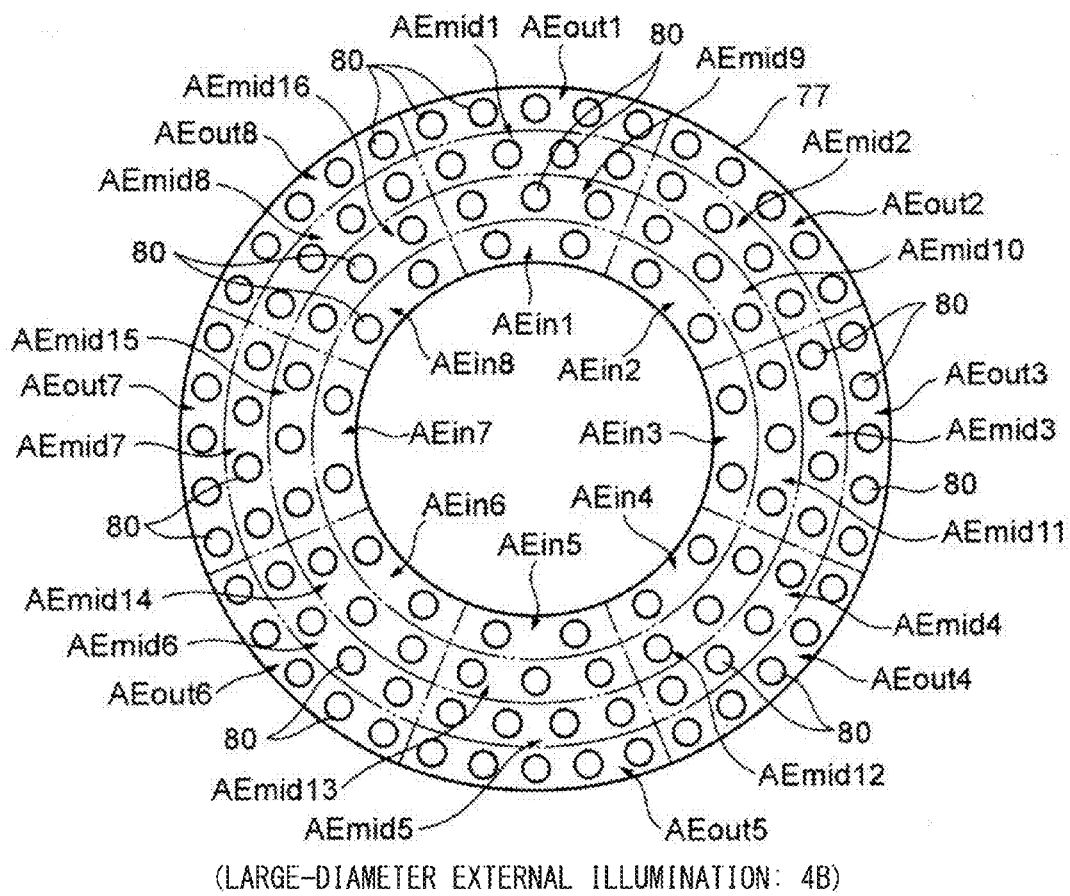
FIG. 23 is a front view of the dedicated external illumination unit having the large diameter, and is a view for describing that LEDs included in this external illumination unit are divided into a plurality of areas to control lighting on the area basis.
Figure 24:
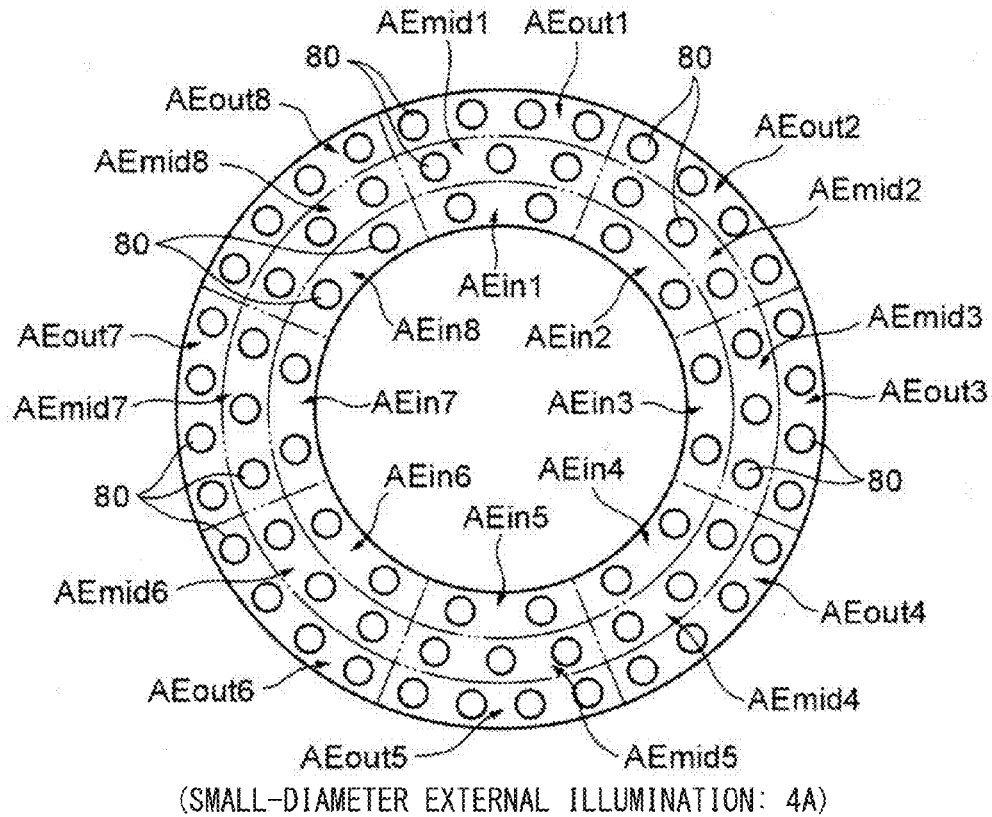
FIG. 24 is a front view of the dedicated external illumination unit having the small diameter, and is a view for describing that LEDs included in this external illumination unit are divided into a plurality of areas to control lighting on the area basis.

Types of Dedicated External Illumination Unit 4 (FIGS. 23 and 24):

Two models are prepared for the dedicated external illumination unit 4. FIG. 23 illustrates the LED substrate 77 of an external illumination unit 4B having a large diameter. FIG. 24 is a plan view of the LED substrate 77 of an external illumination unit 4A having a small diameter. These two types of external illumination units 4 each include the CPU and the memory M as described above. When the model information is each stored in the memory M, and any one of the external illumination units 4A, 4B is connected to the bar code reader 2, the bar code reader 2 takes in the model information stored in the memory M of the external illumination unit 4 to thereby recognize the external illumination unit 4, which allows the connection setting with the external illumination unit 4 to be executed.

Figure 22:
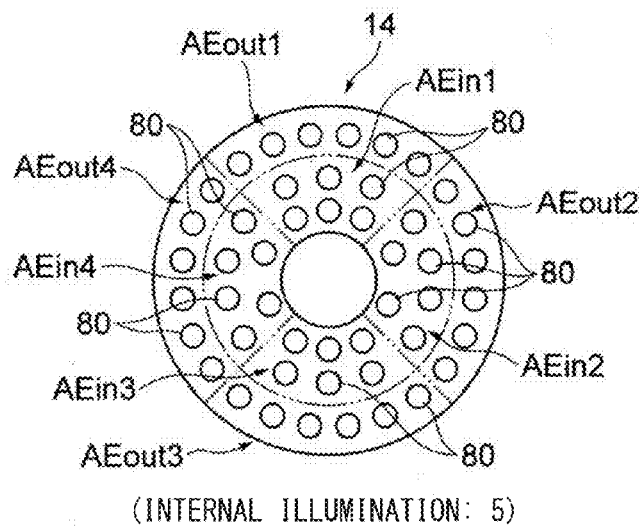
FIG. 22 is a front view of an internal illumination unit, and is a view for describing that LEDs included in the internal illumination unit, which is incorporated in the bar code reader and is a surface light source with the plurality of LEDs arrayed two-dimensionally, are divided into a plurality of areas, and that lighting control on the area basis is enabled.

Partial Illumination of Internal Illumination Unit 5 (FIG. 22):

FIG. 22 is a plan view of the LED substrate 14 incorporated in the bar code reader 2. In the ring-shaped LED substrate 14, a large number of illumination LEDs 80 are arrayed almost uniformly in an entire circumference thereof. The illumination LEDs 80 are arranged at almost the same interval on three concentric circles at a distance from one another in a radial direction. More particularly, the plurality of illumination LEDs 80 are arrayed on the plurality of concentric circles different in diameter centering on the optical axis of the lens assembly 36 of the bar code reader 2.

In the ring-shaped LED substrate 14, partial illumination is performed, using, as a unit, each of a total of eight areas that are formed by dividing an entire area into four blocks at even intervals in a circumferential direction, and further dividing each of the blocks into two in the radial direction. Specifically, one row in an outermost circumference is divided into four areas at an interval of 90°. These areas are illustrated as an outer circumference first area AEout 1, an outer circumference second area AEout 2, an outer circumference third area AEout 3, and an outer circumference fourth area AEout 4. Two innermost and intermediate rows are divided into four areas at an interval of 90°. These areas are illustrated as an inner circumference first area AEin 1, an inner circumference second area AEin 2, an inner circumference third area AEin 3, and an inner circumference fourth area AEin 4. The LEDs 80 belonging to the respective areas of AEout 1 to AEout 4, and AEin 1 to AEin 4 are positioned so as to be distributed uniformly in the respective areas.

The illumination can be controlled, using each of the areas of the divided areas AEout 1 to AEout 4, and AEin 1 to AEin 4 of the internal illumination unit 5 as a unit. The lighting control by the division into these areas may include control of an amount of luminescence of the LEDs 80.

Partial Illumination of External Illumination Unit 4b Having Large Diameter (FIG. 23):

In the ring-shaped LED substrate 77 of the external illumination unit 4B having the large diameter, a large number of illumination LEDs 80 are arrayed almost uniformly in an entire circumference thereof. The illumination LEDs 80 are arranged at almost the same interval on four concentric circles at a distance from one another in a radial direction. More specifically, the plurality of illumination LEDs 80 are arrayed on the four concentric circles different in diameter centering on the optical axis of the lens assembly 36 of the bar code reader 2.

In the external illumination unit 4B having the large diameter, partial illumination is performed, using, as a unit, each of a total of 32 areas that are formed by dividing an entire area into eight blocks at even intervals in a circumferential direction, and further dividing each of the blocks into four in the radial direction. Specifically, in the ring-shaped LED substrate 77, a row in an outermost circumference is divided into eight areas at an interval of 45°. These areas are illustrated as an outer circumference first area AEout 1 to an outer circumference eighth area AEout 8. The next row is also divided into eight areas at an interval of 45°. These areas are illustrated as an outer intermediate first area AEmid 1 to an outer intermediate eighth area AEmid 8. The next row is also divided into eight areas at an interval of 45°. These areas are illustrated as an outer intermediate ninth area AEmid 9 to an outer intermediate 16th area AEmid 16. A row in an innermost circumference is divided into eight areas at an interval of 45°. These areas are illustrated as the inner circumference first area AEin 1 to an inner circumference eighth area AEin 8. The external illumination unit 4B having the large diameter can also be controlled, using each of a total of 32 areas as a unit. In the external illumination unit 4B as well, the control of the amount of luminescence of the LEDs 80 can be executed on the area basis.

Partial Illumination of External Illumination Unit 4a Having Small Diameter (FIG. 24):

Referring to FIG. 24, in the ring-shaped LED substrate 77 of the external illumination unit 4A having the small diameter, a large number of illumination LEDs 80 are arrayed almost uniformly in an entire circumference thereof. The illumination LEDs 80 are arranged at almost the same interval on three concentric circles at a distance from one another in a radial direction. More specifically, the plurality of illumination LEDs 80 are arrayed on the three concentric circles different in diameter centering on the optical axis of the lens assembly 36 of the bar code reader 2.

In the ring-shaped LED substrate 77, a row in an outermost circumference is divided into eight areas at an interval of 45°. These areas are illustrated as the outer circumference first area AEout 1 to the outer circumference eighth area AEout 8. An intermediate row is also divided into eight areas at an interval of 45°. These areas are illustrated as the outer intermediate first area AEmid 1 to the outer intermediate eighth area AEmid 8. A row in an inner circumference is also divided into eight areas at an interval of 45°. These areas are illustrated as the inner circumference first area AEin 1 to the inner circumference eighth area AEin 8. In the external illumination unit 4A having the small diameter, the partial illumination can also be set by dividing the entire area into a total of 24 areas. The lighting control by dividing the entire area into these areas may include the control of an amount of luminescence of the illumination LEDs 80. A color of the illumination by the illumination LEDs 80 may be varied, using each of the areas set for the partial illumination as a unit.

Figure 25:
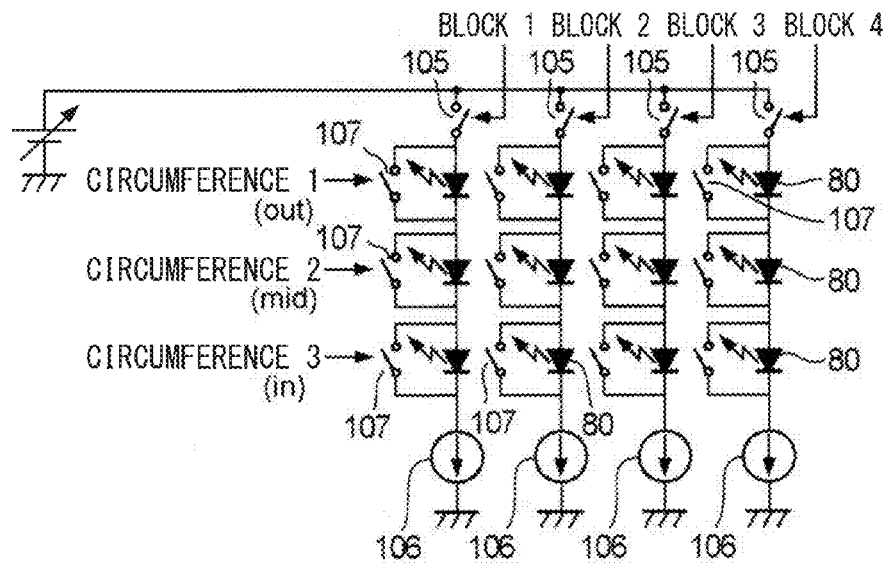
FIG. 25 is a diagram showing one example of an LED drive circuit each incorporated in the internal illumination unit and the external illumination unit

LED Drive Circuit of External Illumination Unit 4 (FIG. 25):

FIG. 25 shows a part of the LED drive circuit. The illustrated LED drive circuit can light the LEDs 80 on the area basis, and can supply a constant current to the plurality of illumination LEDs 80 belonging to each of the areas.

For example, with the small-diameter external illumination unit 4A in FIG. 24, the eight areas resulting from circumferentially dividing the ring-shaped LED substrate 77 at the interval of 45° are referred to as "blocks". For example, the outer circumference first area AEout 1, the intermediate first area AEmid 1, the inner circumferential first area AEin 1 make up a first block. In each of the blocks, a block switch 105 and a constant current circuit 106 are provided. Turning ON the block switch 105 brings a state where a voltage can be applied to the plurality of LEDs 80 belonging to the relevant block. For the plurality of LEDs 80 in each row, a row switch 107 to bypass the LEDs 80 is provided on the block basis, and a group of the illumination LEDs 80 connected parallel to each of the row switches 107 is connected in series. In FIG. 25, while only one of the illumination LEDs 80 is illustrated in each of the circumferential rows, this is only because the diagram is simplified, and it should be understood that a plurality of illumination LEDs 80 connected parallel to each of the row switches 107 are present in series.

The LEDs in each of the rows belonging to each of the blocks are connected in series, and in each of the rows, the row switch 107 is connected in parallel. Accordingly, turning OFF the arbitrary row switch 107 allows the constant current to be supplied to the plurality of LEDs 80 belonging to the relevant block and the relevant row. The external illumination unit 4A includes this LED drive circuit, by which the area of the partial illumination can be arbitrarily set, using each of the rows in each of the blocks as a unit. Moreover, by providing the constant current circuit 106 in each of the blocks, for example, a current flowing in the illumination LEDs 80 in the first to third circumferential rows in the same block can be maintained constant.

In other words, without the constant current circuit 106, for example, if the illumination LEDs 80 in the first circumferential row are switched from OFF to ON when the illumination LEDs 80 in the second and third circumferential rows are lighted, the voltage applied to the illumination LEDs 80 in the second and third circumferential rows will change, thereby changing the current flowing the illumination LEDs 80 in the second and third rows, and thus changing brightness.

In other words, even when the block switch 105 is turned ON/OFF, the amount of luminescence of the illumination LEDs 80 belonging to the other blocks does not change. This is because the respective blocks are connected to the power source in parallel. However, when the row switch 107 is turned ON/OFF, the number of the LEDs 80 lighted in the relevant block changes, so that the brightness of the LEDs 80 changes with this.

When the lighting pattern of the partial illumination is set, fluctuation factors of the brightness of the LEDs 80 are desirably eliminated as much as possible in view of searching an optimal way to throw the light to the work. For this reason, the constant current circuit 106 is provided in each of the blocks. Thereby, when setting work of the lighting pattern is performed, it becomes easier to find the optimal lighting pattern by assuring uniformity and constancy of the luminance of the LEDs 80 in the lighted area to perform the partial illumination when the lighting pattern is changed. For the external illumination unit 4B having the large diameter, and the internal illumination unit 5, the LED drive circuit in FIG. 25 can be similarly employed.

Figure 26:
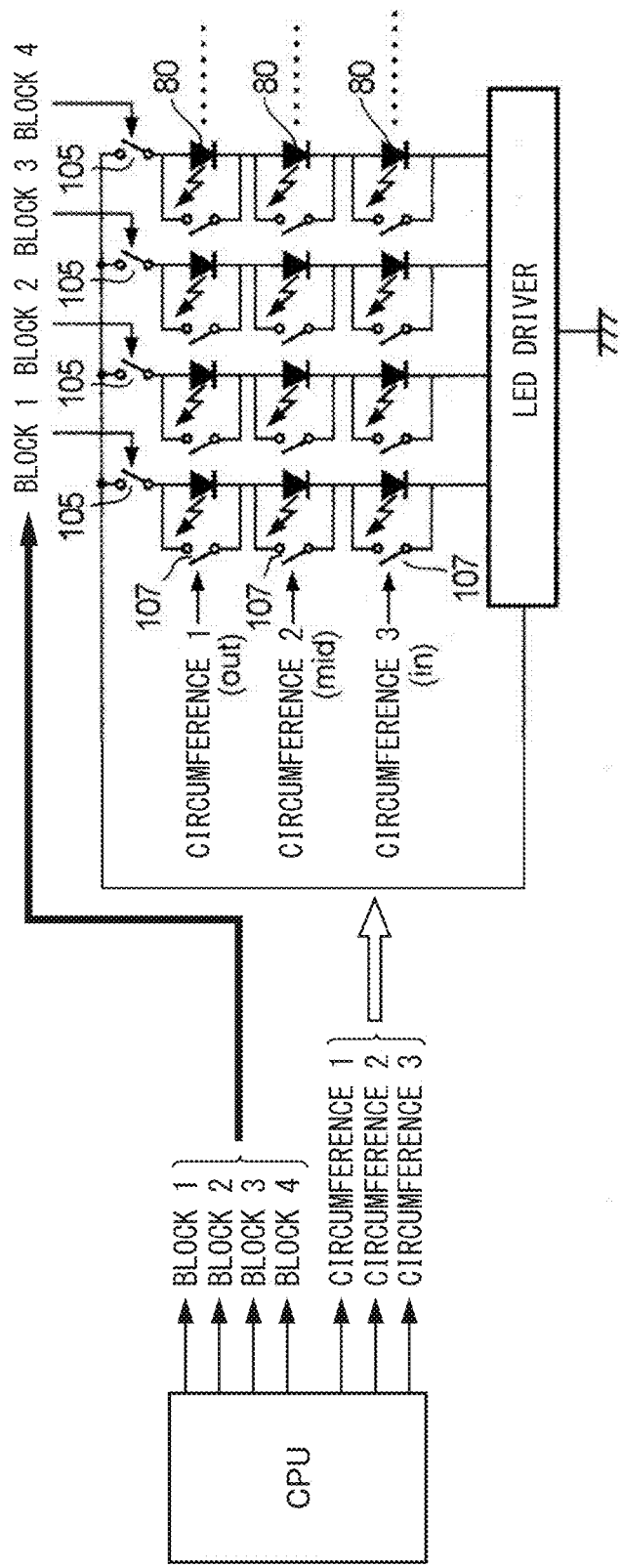
FIG. 26 is a system diagram for controlling partial illumination of the internal illumination unit and the external illumination unit.

Partial Illumination of Internal Illumination Unit 5 and External Illumination Unit 4 (FIG. 26):

The internal illumination unit 5 and the external illumination unit 4 are both surface light sources with the plurality of LEDs arrayed two-dimensionally, and the surface light sources can be each divided into several areas circumferentially and radially to perform partial illumination, using each of the areas as a unit, and the lighting pattern defining which area is to be lighted and which area is not to be lighted can be arbitrarily set by the user. The lighting pattern including the lighting in all the areas can be registered by the user using the PC 3, and the lighting pattern set by the user is stored in the memory M of the bar code reader 2, and in the memory M of the external illumination unit 4 when the external illumination unit 4 is connected. This lighting control includes the control of the amount of luminescence of the illumination LEDs 80. In FIG. 26 as well, similarly to FIG. 25, while only one of the illumination LEDs 80 is illustrated in each of the circumferential rows, this is only because the diagram is simplified, and it should be understood that a plurality of illumination LEDs 80 connected parallel to each of the row switches 107 are present in series.

As described with reference to FIG. 1, the external illumination unit 4 includes a control unit of the CPU. Accordingly, as illustrated in FIG. 26, the respective block switches 105 and the row switches 107 in the respective circumferential rows are controlled by the CPU of the external illumination unit 4, so that when the circumferentially and radially divided partial illumination areas are set, the lighting control of the LEDs 80 is executed, using each of these areas as a unit.

Figure 27:
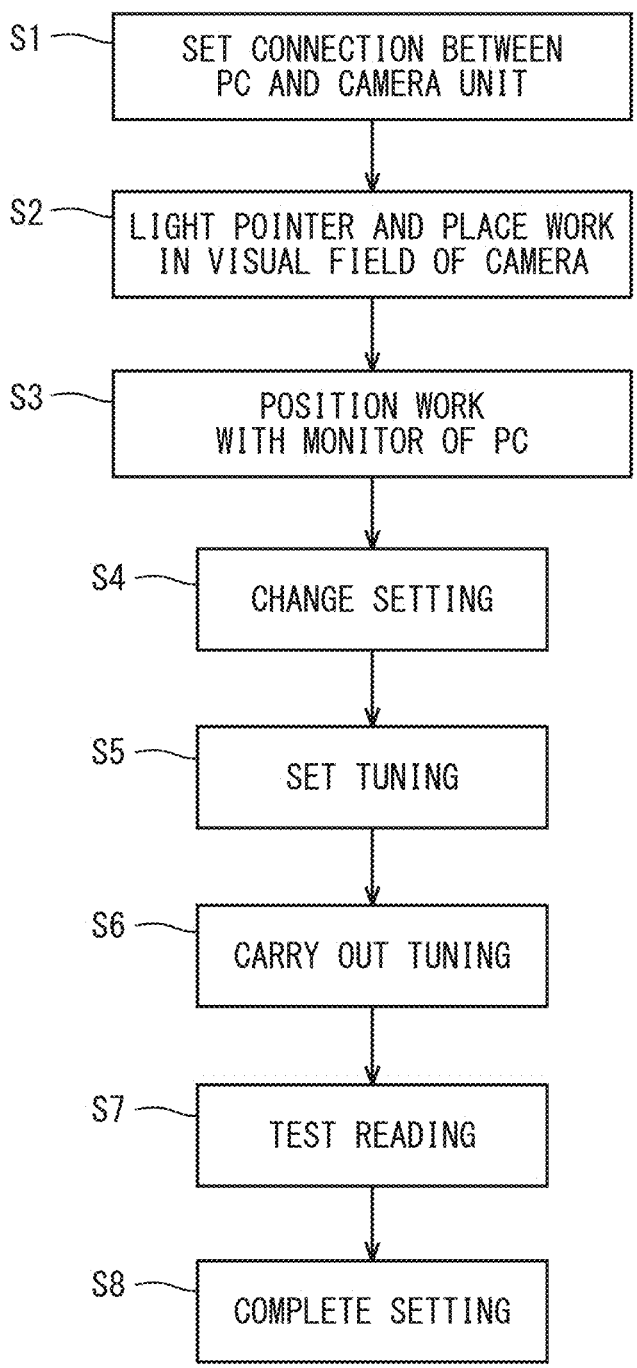
FIG. 27 is a process chart for describing a flow of setting of the bar code reader system.

Setting of Bar Code Reader System (FIG. 27):

FIG. 27 is a flowchart for describing a series of procedure relating to the setting of the bar code reader system 1 using the personal computer 3. Referring to FIG. 27, the connection setting between the personal computer (PC) 3 and the bar code reader 2 is made (S1). At this time, assigning a tentative IP address enables easy and convenient connection setting. When the dedicated external illumination unit 4 is connected to the bar code reader 2, the model information of the relevant external illumination unit 4 stored in the memory M (FIG. 1) of the external illumination unit 4 is read, which allows the connection setting of the external illumination unit 4 to be automatically executed, based on the model information registered in the memory M (FIG. 1) of the bar code reader 2 in advance.

Next, the pair of LEDs 40 for pointer incorporated in the bar code reader 2 are lighted, and the work is placed within the visual field range of the bar code reader 2 (S2). The work is positioned with a monitor of the PC 3 (S3).

Subsequently, using the PC 3, various settings are made (S4). These settings are made mainly to make the optical information (the bar code or the QR code) of the work easy to see. The settings include the setting of the area to be lighted in the internal illumination unit 5, and the lighting area pattern setting to set which of the areas that can be controlled to be lighted in the external illumination unit 4 is to be lighted when the external illumination unit 4 is used, and the like.

After finishing these settings, tuning setting, which is fine adjustment of the settings, is performed (S5). The tuning setting includes selection of brightness priority or processing speed priority, setting of a tuning method, and the like, and the fine adjustment of the setting is actually carried out (S6). When the turning succeeds, a reading test is performed (S7). When it is confirmed in the reading test that the decoding of the optical information of the work is stably performed, the setting work is completed (S8).

Setting of Lighting Pattern (FIGS. 28 to 33):

Referring to FIG. 1, the illumination setting program is installed on the personal computer 3, and the illumination setting of the internal illumination unit 5 and the external illumination unit 4 is made by this illumination setting program. That is, the personal computer 3 functions as the illumination setting support apparatus by having the illumination setting program incorporated therein.

The illumination setting work is included in the work in step S4 described with reference to FIG. 27. The illumination setting that the user creates using the illumination setting program is transferred to the bar code reader 2 and stored in the memory M of the bar code reader 2. When the external illumination unit 4 is connected, the illumination setting is thereafter transferred to the external illumination unit 4 to be temporarily stored in the memory M of the external illumination unit 4.

According to the illumination setting, the control of the external illumination unit 4 is such that when a trigger command is outputted from the bar code reader 2, the external illumination unit 4 can receive the trigger command through the communication to execute the illumination with reference to the illumination setting stored in the memory M of the external illumination unit 4.

Figure 28:
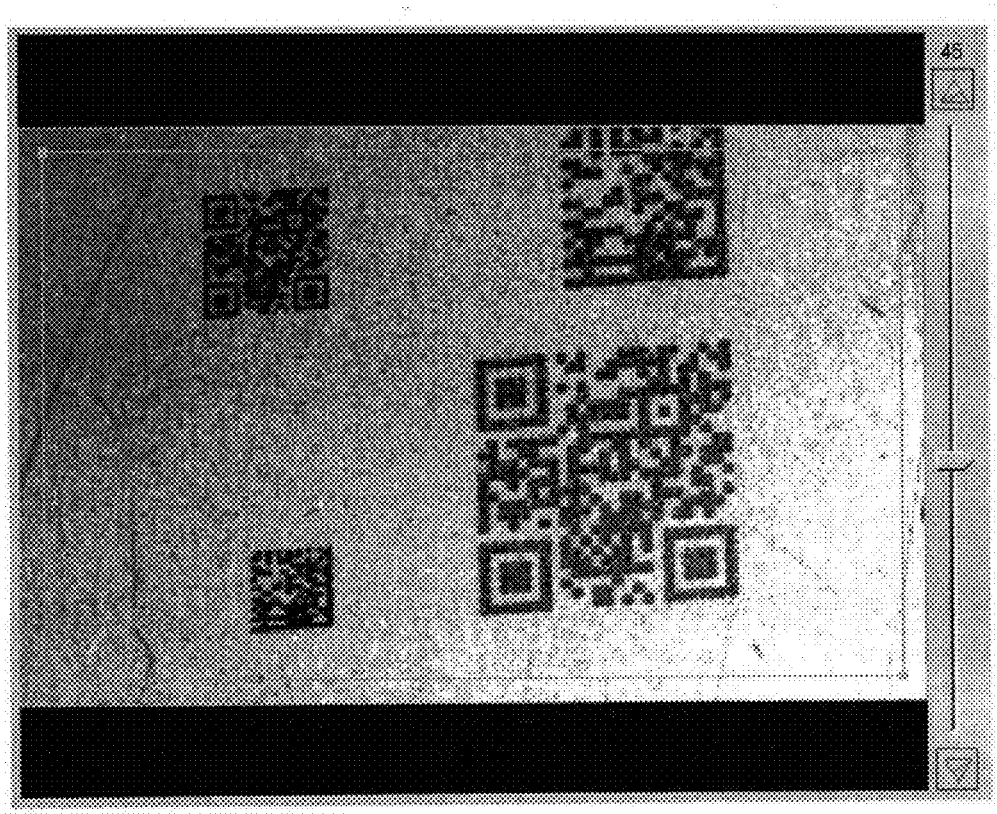
FIG. 28 is a view showing an image displayed on a personal computer connected to the bar code reader, on which an illumination setting program to set the illumination of the internal illumination unit and the external illumination unit of the bar code reader is installed, and showing a state where the image picked up by the bar code reader is displayed in real time.

The illumination setting program installed on the personal computer 3 has a real time screen shown in FIG. 28, and an image picked up by the bar code reader 2 is displayed in real time as shown in FIG. 28. The picked-up image may be a live image, or may be a static image. In the case of the live image, a test piece on which the optical information is printed is moved in the visual field range of the bar code reader 2 to thereby check how the light is thrown to the optical information.

FIGS. 29 to 32 shows a display screen illustrating an update of the live image in real time, which is executed with the selection of the lighting pattern by the user operating the personal computer 3. For the live image, an amount of light, exposure time, a gain and the like of the illumination are feedback-controlled so that an average value of brightness in a brightness setting region determined in advance becomes brightness adjusted by the user sliding a brightness adjustment bar prepared in the display screen. This enables the image display while keeping constant the brightness in a region in which the user is interested, even when the lighting pattern is changed.

Figure 30:
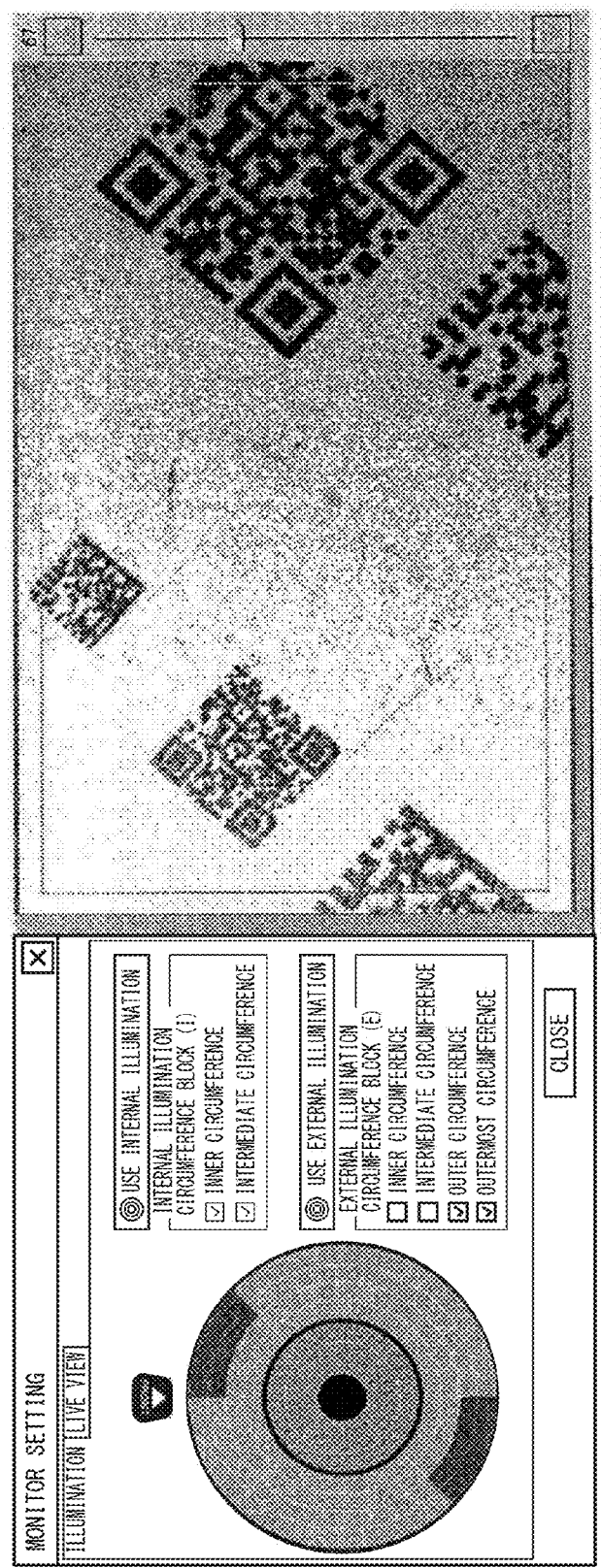
FIG. 30 is a view showing the illumination setting screen displayed on the personal computer by the illumination setting program, and a real-time image of the picked-up image simultaneously displayed, and showing a state where, in the external illumination unit, the areas opposed to each other in the outermost circumference are set as the illumination areas.
Figure 31:
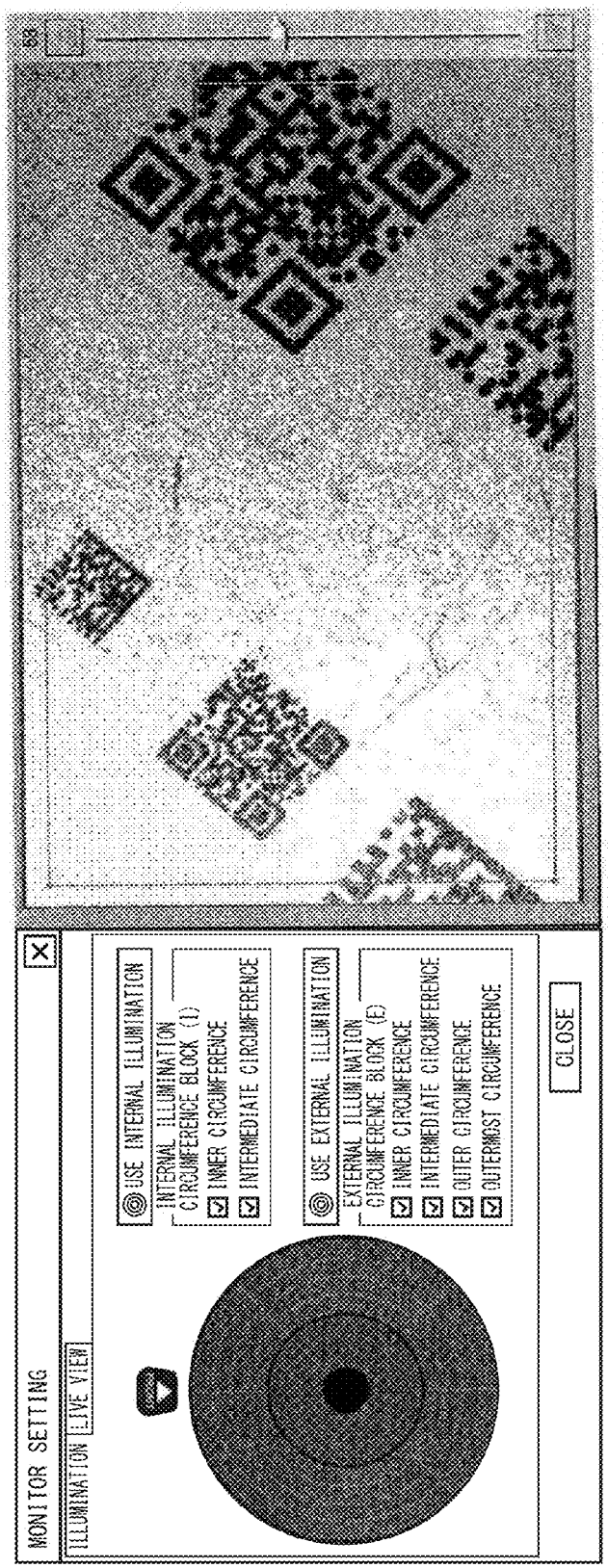
FIG. 31 is a view showing the illumination setting screen displayed on the personal computer by the illumination setting program, and a real-time image of the picked-up image simultaneously displayed, and showing a state where all the areas of the external illumination unit and the internal illumination unit are set as the illumination areas.

The display screen of the personal computer 3 will be described, taking FIG. 29 as an example. A setting screen of the lighting pattern is displayed on the left side, and the live image is simultaneously displayed on the right side. Obviously, the setting screen may be displayed so as to be superimposed on the live image in FIG. 28. The display in FIGS. 29 to 31 shows a display aspect when the external illumination unit 4B having the large diameter is connected.

Figure 29:
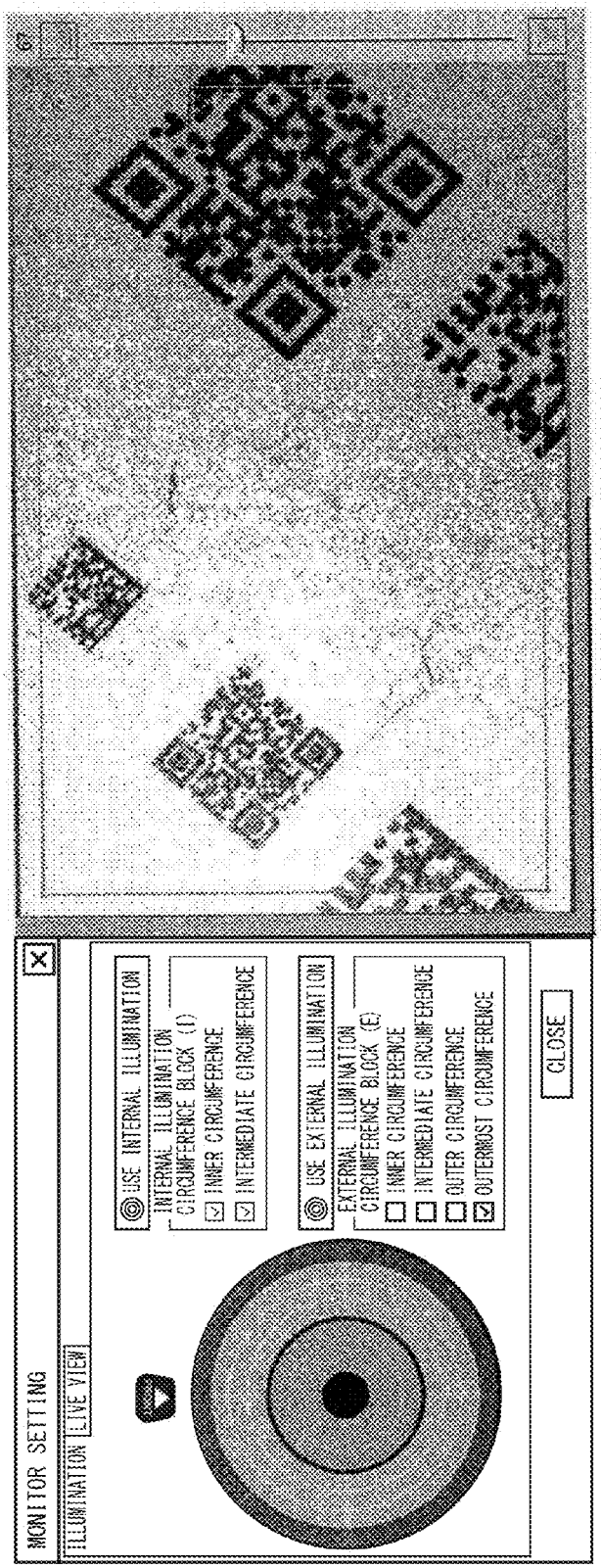
FIG. 29 is a view showing an illumination setting screen displayed on the personal computer by the illumination setting program, and a real-time image of the picked-up image simultaneously displayed, and showing a state where, in the external illumination unit, all circumferential areas in an outermost circumference are set.

FIG. 29 shows a state where the internal illumination unit 5 is not selected, only the external illumination unit 4 is selected, and a check mark is placed on the outermost circumference of the external illumination unit 4. As selection items of the external illumination unit 4, there are selection items of four circumferential rows of (1) an "outermost circumference", (2) an "outer circumference", (3) an "intermediate circumference", and (4) an "inner circumference". In this case, (1) the "outermost circumference" means AEout 1 to AEout 8 in the outermost circumference in FIG. 23, (2) the "outer circumference" means AEmid 1 to AEmid 8 in FIG. 23, (3) the "intermediate circumference" means AEmid 9 to AEmid 16 in FIG. 23, and (4) the "inner circumference" means AEin 1 to AEin 8. As the selection using each of these circumferential rows as a unit, one or a plurality of options can be selected.

In FIG. 29, only the circumferential row of the "outermost circumference" is selected. In the setting screen, a schematic diagram expressing the respective areas of the dedicated external illumination unit 4 in similar figures is displayed, and using this schematic diagram, the user clicks on an arbitrary area of the eight areas AEout 1 to AEout 8 in the outermost circumference, which allows the area to be lighted to be set from the eight areas in the outermost circumference.

This example of FIG. 29 shows a state where the user has clicked on all the eight areas AEout 1 to AEout 8 in the outermost circumference to set the lighting of these eight areas AEout 1 to AEout 8. With this illumination setting, since the lighting pattern is displayed in the schematic diagram of the illumination unit displayed in the setting screen, the user can immediately visually know what lighting pattern he or she has set. In FIG. 29, all the areas in the outermost circumference that the setting is made to light are displayed in red in a ring shape, and the other areas are displayed in gray. Needless to say, with the schematic diagram of the respective areas of the illumination unit displayed in the setting screen, the schematic diagram expressing all the areas of the external illumination unit 4A having the small diameter in similar figures is displayed when the dedicated external illumination unit 4A having the small diameter is connected.

When the user sets the arbitrary area from the eight areas in the circumferential row of the "outermost circumference" of the external illumination unit 4B having the large diameter, this information is transmitted to the bar code reader 2, transferred to the external illumination unit 4B, temporarily stored in the memories M of the bar code reader 2 and the external illumination unit 4B, and subsequently, the imaging is performed while executing the illumination control in accordance with the lighting pattern. This live picked-up image is transmitted to the personal computer 3 so that this live image is displayed on the right side of the display screen in FIG. 29. The user can move the test piece while viewing the live image to check how the optical information printed on the test piece is imaged.

FIG. 30 shows a state where the items of the two circumferential rows of the "outermost circumference" and the "outer circumference" of the external illumination unit 4B having the large diameter are selected, and the four areas AEout 2, AEmid 2, AEout 6, AEmid 6 (FIG. 23) opposed to each other among the 16 areas in the outermost circumference and the next inner circumference are set by the user's click operation. As seen from FIG. 30, in the schematic diagram of all the areas of the illumination unit included in the setting screen, the relevant portions are displayed in red, and the non-selected areas are displayed in gray. The real time image on the right side in FIG. 30 is the live image by the bar code reader 2 while the illumination is performed in the four areas AEout 2, AEmid 2, AEout 6, AEmid 6 are illuminated.

FIG. 31 shows a state where all the items of the external illumination unit 4 and all the items of the internal illumination unit 5 are selected, and the setting is made by the user's click operation so as to light all the areas of the external illumination unit 4 and all the areas of the internal illumination unit 5. As seen from FIG. 31, in the schematic diagram of all the areas of the illumination unit included in the setting screen, all the areas of the external illumination unit 4 and the internal illumination unit 5 inside the same are displayed in red. This information is transmitted to the bar code reader 2, and is transferred to the external illumination unit 4B to perform the imaging while executing the illumination control in accordance with the lighting pattern to set the lighting of all the areas. The live image is immediately transmitted to the personal computer 3, and is displayed in real time on the right side of the display screen in FIG. 31.

Figure 32:
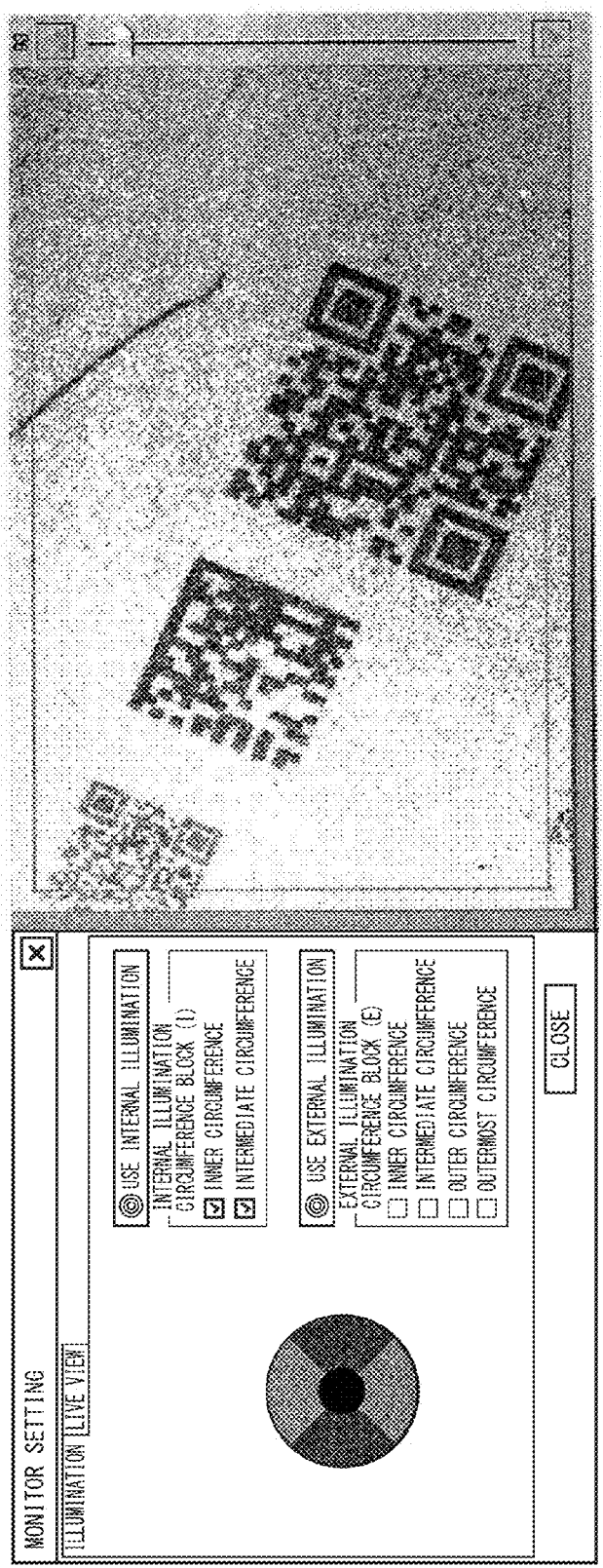
FIG. 32 is a view showing the illumination setting screen displayed on the personal computer by the illumination setting program, and a real-time image of the picked-up image simultaneously displayed, and showing a state where the external illumination unit is unconnected, and the areas opposed to each other in the internal illumination unit are set as the illumination areas.

FIG. 32 shows a display aspect when the external illumination unit 4 is in an unconnected state, and all the selection items of the internal illumination unit 5 are selected. In the internal illumination unit 5 as well, there are two selection items of the circumferential rows, (1) an "inner circumference" and (2) an "intermediate circumference", and the lighting setting as to which area in the circumferential rows of the respective items is to be lighted is enabled by the user's click operation. In this example of FIG. 32, the "inner circumference" and the "intermediate circumference" are selected, and the four areas of AEout 2, AEin 2, AEout 4, AEin 4 (FIG. 22) are set to be lighted by the user's click operation. In the internal illumination unit 5 as well, the "inner circumference" and the "intermediate circumference" can be selected alternatively, or both of them can be selected, which enables the selection using each of the circumferential rows radially divided as a unit.

As seen from FIG. 32, the schematic diagram of the illumination unit included in the setting screen expresses all the areas of the internal illumination unit 5. The non-selected areas are displayed in gray, and the areas AEout 2, AEin 2, AEout 4, AEin 4 (FIG. 22) set to be lighted by the user are highlighted in red. The real time image on the right side in FIG. 32 is a live image of the bar code reader 2, which is imaged while performing the illumination in the selected areas AEout 2, AEin 2, AEout 4, AEin 4 of the internal illumination unit 5.

As can be understood from the above transition of the display, the user decides the area to be lighted while viewing the schematic diagram expressing all the settable areas of the illumination unit 4 in similar figures, and the lighting pattern including the illumination areas set by the user is sent to the bar code reader 2. The bar code reader 2 picks up the image in accordance with this lighting pattern, and the picked-up image is immediately displayed. This picked-up image is preferably the live image.

By viewing the schematic diagram in the setting screen, the user can intuitively recognize the settable areas and can observe the live image as a result of the lighting pattern set by the user, thereby grasping change in the way of applying the illumination in real time.

If the picked-up images in FIGS. 29 to 33 are the live images, representative static images thereof are stored in the memory of the personal computer 3 together with the respective illumination settings, and final illumination parameters can be set by the user selecting an optimal image while comparing the images in FIGS. 29 to 33.

In the above-described lighting area setting of the dedicated external illumination unit 4 and the internal illumination unit 5, obviously, the arbitrary area can be selected by merely clicking on the area of the schematic diagram without depending on the selection items of the circumferential rows such as the "inner circumference", the "intermediate circumference" and the like.

Figure 33:
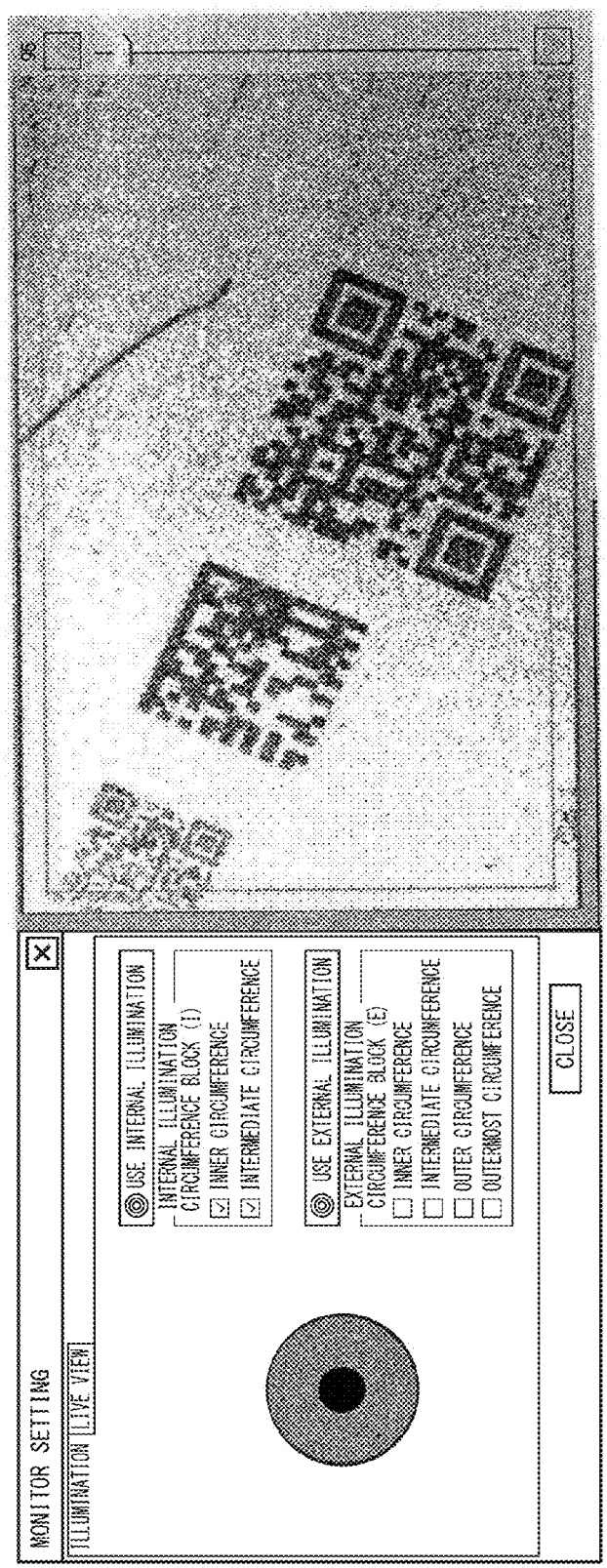
FIG. 33 is a view showing the illumination setting screen displayed on the personal computer by the illumination setting program, and a real-time image of the picked-up image simultaneously displayed, and showing a display state of the illumination setting screen when a general-purpose external illumination unit is connected.

FIG. 33 shows a display example when a general-purpose external illumination unit is connected. When the external illumination unit that the bar code reader 2 cannot recognize is connected, all the selection items are displayed in gray.

Figure 34:
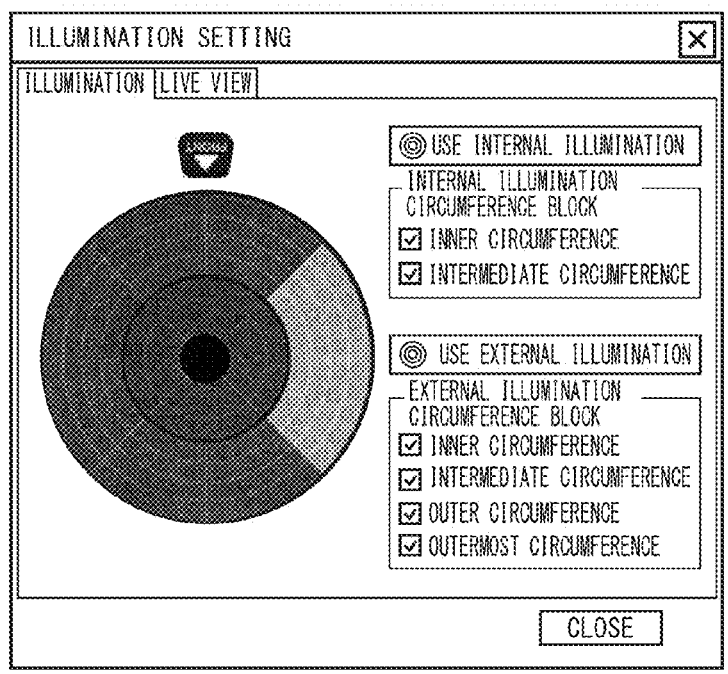
FIG. 34 is a view showing a display aspect when the external illumination unit having the large diameter is connected among the plurality of the illumination setting screens to be displayed on the personal computer by the illumination setting program.
Figure 35:
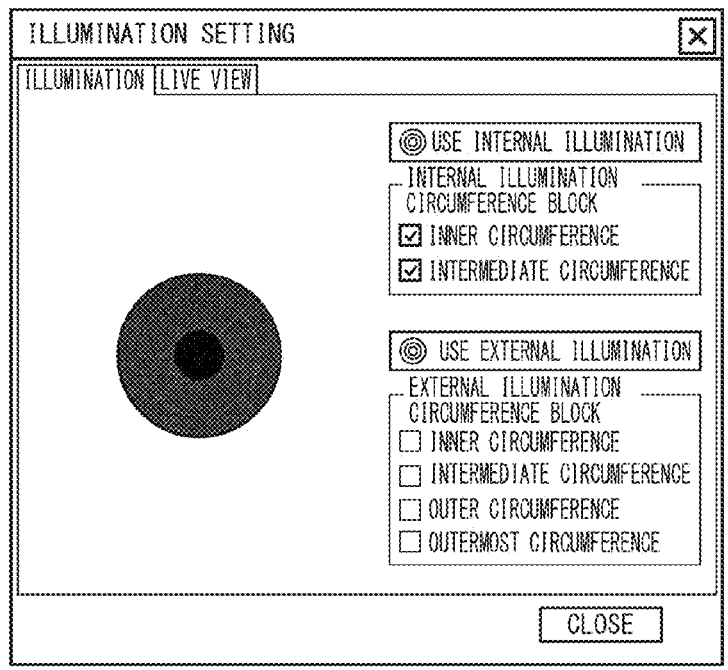
FIG. 35 is a view showing a display aspect when none of the external illumination units are connected among the plurality of the illumination setting screens to be displayed on the personal computer by the illumination setting program.

Setting Screen (FIGS. 34 and 35):

FIG. 34 shows the lighting pattern setting screen of the partial illumination when the dedicated external illumination unit 4 is connected, and FIG. 35 shows the setting screen in a state where neither of the dedicated external illumination unit 4 and the general-purpose external illumination unit is connected. As seen from the comparison of FIGS. 34 and 35, when the dedicated external illumination unit 4 is connected (FIG. 34), there is displayed the schematic diagram of the illumination unit expressing the respective areas of the dedicated external illumination unit 4 and the respective areas of the internal illumination unit 5 in a ring shape similar to these units 4, 5. On the other hand, in the case of only the internal illumination unit 5, there is displayed the schematic diagram of the illumination unit expressing the respective areas of the internal illumination unit 5 in a ring shape similar to the internal illumination unit. That is, for each of the illumination units used for the illumination of the bar code reader 2, the schematic diagram corresponding to the relevant illumination unit is displayed in the pattern setting screen.

Figure 36:
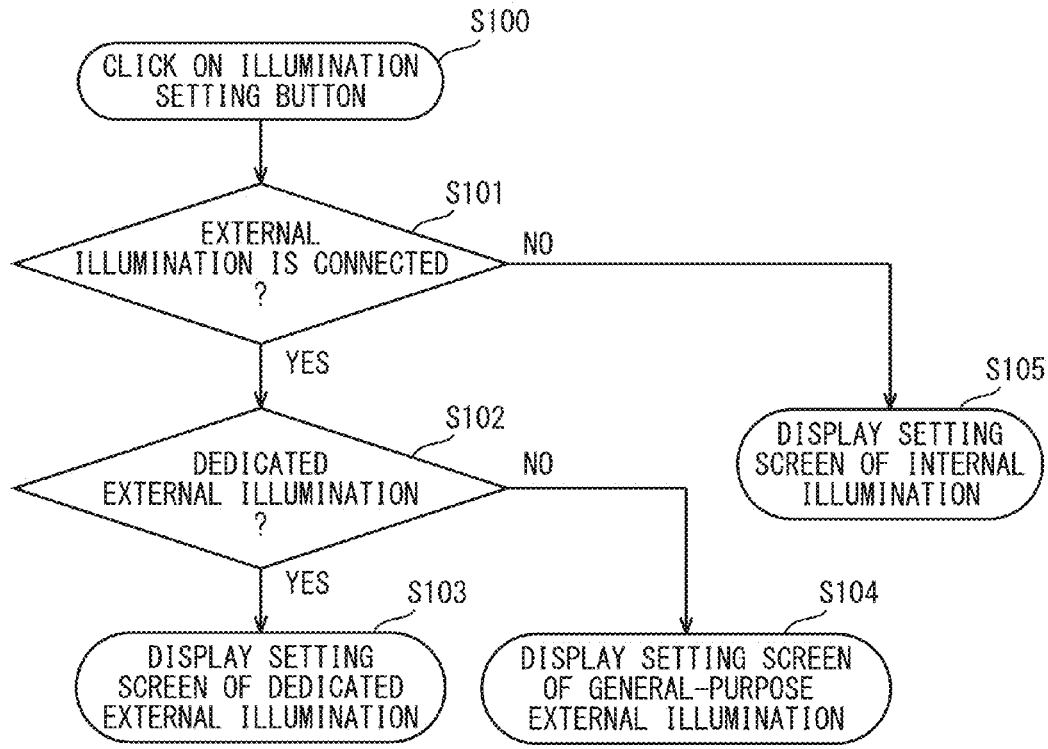
FIG. 36 is a flowchart for describing processing in which the illumination setting program selects the illumination setting screen.
Figure 37:
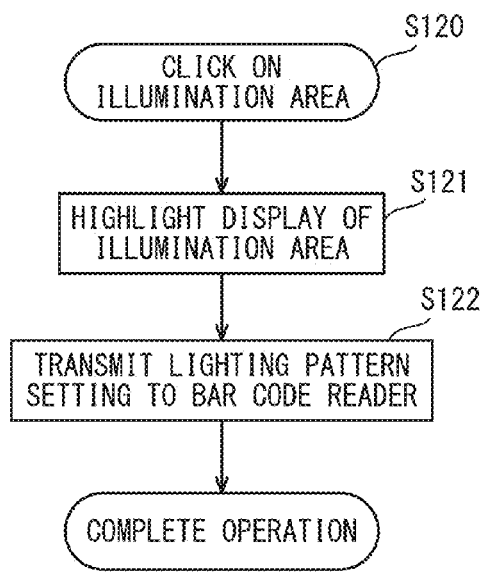
FIG. 37 is a flowchart for describing procedures for selection of the illumination area, and execution of the illumination in accordance with the selected area by the user.

Setting Operation of Lighting Pattern (FIGS. 36 and 37):

FIGS. 36 and 37 are flowcharts for describing procedures for illumination setting using the setting program of the personal computer 3. FIG. 36 is a flowchart for describing processing in which the illumination setting program selects the illumination setting screen.

Referring to FIG. 36, when an illumination setting button (not shown) of the display screen of the personal computer 3 is clicked (S100), the setting program is activated, and it is determined whether or not the external illumination unit is connected (S101). The external illumination unit includes the dedicated external illumination unit 4 and the general-purpose external illumination unit. If determined as YES in step S101, it is determined whether or not the external illumination unit is the dedicated external illumination unit 4 in the next step S102, and if YES, the processing proceeds to step S103 to display the setting screen (FIG. 34) of when the dedicated external illumination unit 4 is connected.

If determined as NO in step S102, the processing proceeds to step S104 to display the setting screen (FIG. 33) of when the general-purpose external illumination unit is connected. Moreover, if determined as NO in step S101, it is determined that the external illumination unit is not connected, and the processing proceeds to step S105 to display the setting screen (FIG. 33) of when the dedicated external illumination unit is absent.

Referring to FIG. 37, the setting processing of the lighting pattern will be described. If one of the areas in the schematic diagram displayed in the setting screen is clicked in step S120, the display of the clicked area is changed to be highlighted, for example, in red (S121). The information of the illumination setting by the user is immediately transferred to the bar code reader 2, and the imaging of the bar code reader 2 is executed, and preferably, the live image is transmitted to the personal computer 3, so that the live image is displayed on the personal computer 3 in real time, as described in FIGS. 28, 29, and the like. The user will set the optimal setting pattern while viewing the live image. Obviously, the setting of the lighting pattern, that is, the setting of the illumination parameters may include the setting of the amount of light (intensity of light) of the illumination LEDs 80.

As can be understood from the above description, the use of the illumination setting program enables the user to perform the illumination setting while intuitively and visually checking the live image. The lighting pattern set by the illumination setting program is stored in the memories M of the bar code reader 2 and the dedicated external illumination unit 4, by which the illumination control of the dedicated external illumination unit 4 by the above-described communication is executed.

The present invention is applied to the illumination of the optical information reading apparatus that reads the optical information such as the bar code and the QR code.

What is claimed is:

1. An illumination setting support apparatus that supports setting of illumination of an optical information reading apparatus that reads optical information while illuminating the optical information with a surface light source configured with a plurality of illumination LEDs, the illumination setting support apparatus comprising:

a schematic diagram display device that displays a diagram schematically expressing a plurality of areas on the surface light source configured with the plurality of illumination LEDs;

an area selecting device that enables a user to select at least one of the areas from the schematic diagram displayed by the schematic display device;

a lighting pattern transmitting device that transmits a lighting pattern defining the selected area to the optical information reading apparatus; and a picked-up image display device that acquires an image that the optical information reading apparatus picks up while controlling lighting of the plurality of illumination LEDs in accordance with the lighting pattern, and displays the picked-up image.

2. The illumination setting support apparatus according to claim 1, wherein the picked-up image display device includes a brightness adjusting device that enables adjustment of brightness in a predetermined region by operation of the user, and when the brightness adjusting device is operated, at least one of an amount of light, exposure time, and a gain of the illumination LEDs belonging to the selected area are feedback-adjusted so that an average value of the brightness in the predetermined region becomes brightness defined by the brightness adjusting device.

3. The illumination setting support apparatus according to claim 1, wherein the optical information reading apparatus includes therein an internal illumination unit of a surface light source, the schematic diagram display device schematically displays respective areas resulting from dividing the surface light source of the internal illumination unit into a plurality of areas, and when the user selects at least one of the areas from a schematic diagram of the internal illumination unit with the area selecting unit, a lighting pattern defining the selected area is transmitted to the optical information reading apparatus by the lighting pattern transmitting device.

4. The illumination setting support apparatus according to claim 1, wherein the internal illumination unit is made of a ring-type illumination unit, and the plurality of areas are created by dividing a whole area in a circumferential direction and in a radial direction of the ring-type external illumination unit.

5. The illumination setting support apparatus according to claim 1, wherein the schematic diagram displayed by the schematic diagram display device and the picked-up image displayed by the picked-up image display device are displayed simultaneously.

6. The illumination setting support apparatus according to claim 1, wherein the picked-up image displayed by the picked-up image display device is a live image captured by the optical information reading apparatus in real time.

7. An optical information reading system comprising:
an optical information reading apparatus that reads optical information while illuminating the optical information with a surface light source configured with a plurality of illumination LEDs;
an illumination setting support apparatus that supports setting of illumination of an optical information reading apparatus;
wherein the optical information reading apparatus includes:
an internal illumination unit of a surface light source;
an interface with respect to an external illumination unit;
a control unit which controls the internal illumination unit and the external illumination unit;
wherein the illumination setting support apparatus includes:
a schematic diagram display device that displays a diagram schematically expressing a plurality of areas on the surface light source configured with the plurality of illumination LEDs;
an illumination parameter setting device that enables a user to select at least one of the areas from the schematic diagram displayed by the schematic display device and set an amount of light of the internal illumination unit and the external illumination unit;
a lighting parameter transmitting device that transmits a lighting pattern defining the selected area and the setting of the amount of the light to the optical information reading apparatus; and
a picked-up image display device that acquires an image that the optical information reading apparatus picks up while controlling lighting of the plurality of illumination LEDs in accordance with the lighting pattern and the setting of the amount of the light, and displays the picked-up image.

8. The optical information reading system according to claim 7, wherein the control unit of the optical information unit operates the external illumination unit with the internal illumination unit.

9. The optical information reading system according to claim 7, wherein the external illumination unit in a ring outer shape has a circular outline, and has a circular opening in a center of the circular outline, and the optical information reading apparatus is positioned by a stand so that the center of the circular opening matches the optical axis of the optical information reading apparatus.

10. The optical information reading system according to claim 9, wherein the stand has a plate member and an attachment fitting to set the optical information reading apparatus at an arbitrary height position.

11. An optical information reading system comprising:
an optical information reading apparatus that reads optical information while illuminating the optical information with a surface light source configured with a plurality of illumination LEDs;
an illumination setting support apparatus that supports setting of illumination of the optical information reading apparatus;
wherein the optical information reading apparatus includes:
an internal illumination unit of a surface light source;
an interface for an external illumination unit;
a control unit which controls the internal illumination unit and the external illumination unit;
wherein the illumination setting support apparatus includes:
a schematic diagram display device that displays a diagram schematically expressing a plurality of areas on the surface light source configured with the plurality of illumination LEDs;
a setting device that enables a user to select an amount of light of the internal illumination unit and the external illumination unit;
a transmitting device that transmits the setting of the amount of the light to the optical information reading apparatus; and
a picked-up image display device that acquires an image that the optical information reading apparatus picks up while controlling lighting of the plurality of illumination LEDs and displays the picked-up image.

* * * * *